United States Patent
Oelke et al.

(10) Patent No.: US 7,406,038 B1
(45) Date of Patent: Jul. 29, 2008

(54) SYSTEM AND METHOD FOR EXPANSION OF COMPUTER NETWORK SWITCHING SYSTEM WITHOUT DISRUPTION THEREOF

(75) Inventors: Mark Lyndon Oelke, Spring, TX (US); John E. Jenne, Houston, TX (US); Sompong Paul Olarig, Pleasanton, CA (US); Gary Benedict Kotzur, Spring, TX (US); Matthew John Schumacher, Cypress, TX (US)

(73) Assignee: Ciphermax, Incorporated, Houston, TX (US)

( * ) Notice: Subject to any disclaimer, the term of this patent is extended or adjusted under 35 U.S.C. 154(b) by 1011 days.

(21) Appl. No.: 10/117,040

(22) Filed: Apr. 5, 2002

(51) Int. Cl.
*H04L 12/28* (2006.01)
*G06F 15/177* (2006.01)

(52) U.S. Cl. .................. 370/225; 370/216; 370/227; 370/356; 370/392; 370/401; 709/225; 709/238; 709/250

(58) Field of Classification Search .......... 370/401, 370/216–228, 352–356, 392; 709/226, 238, 709/239, 225, 2; 385/16; 714/1–4
See application file for complete search history.

(56) References Cited

U.S. PATENT DOCUMENTS

| | | | |
|---|---|---|---|
| 4,442,504 A | 4/1984 | Dummermuth et al. | 364/900 |
| 4,598,404 A | 7/1986 | Perry et al. | 371/49 |
| 4,692,073 A | 9/1987 | Martindell | 408/239 |
| 4,755,930 A | 7/1988 | Wilson, Jr. et al. | 364/200 |
| 4,903,259 A | 2/1990 | Hayano | 370/58.3 |
| 5,140,682 A | 8/1992 | Okura et al. | 395/425 |
| 5,247,649 A | 9/1993 | Bandoh | 395/425 |
| 5,289,460 A | 2/1994 | Drake et al. | 370/17 |
| 5,377,180 A | 12/1994 | Laurent | 370/16 |
| 5,394,556 A | 2/1995 | Oprescu | 395/800 |
| 5,515,376 A | 5/1996 | Murthy et al. | 370/85.13 |
| 5,530,832 A | 6/1996 | So et al. | 395/449 |
| 5,586,847 A | 12/1996 | Mattern, Jr. et al. | 408/239 A |
| 5,602,841 A | 2/1997 | Lebizay et al. | 370/413 |
| 5,606,669 A | 2/1997 | Bertin et al. | 395/200.2 |
| 5,611,049 A | 3/1997 | Pitts | 395/200.09 |
| 5,699,548 A | 12/1997 | Choudhury et al. | 395/469 |
| 5,778,429 A | 7/1998 | Sukegawa et al. | 711/129 |
| 5,790,546 A * | 8/1998 | Dobbins et al. | 370/400 |
| 5,805,785 A | 9/1998 | Dias et al. | 395/182 |

(Continued)

OTHER PUBLICATIONS

PCT International Search Report PCT/US01/47769, 3 pages, mailing date Apr. 23, 2002.

(Continued)

*Primary Examiner*—Edan Orgad
*Assistant Examiner*—Venkatesh Haliyur
(74) *Attorney, Agent, or Firm*—Baker Botts L.L.P.

(57) ABSTRACT

A switch fabric system comprises a first chassis for receiving a plurality of line cards each having a plurality of ports and at least two switch fabric cards wherein each line card comprises a plurality of link ports for linking the line card with the switch fabric card. Each switch fabric card provides a switching bandwidth. The system comprises a management unit for managing the traffic on the switch fabric cards wherein the management unit removes the traffic from one switch fabric card if the one switch fabric card is to be removed while the other switch fabric card operates and transfers the traffic to the other switch fabric card.

26 Claims, 16 Drawing Sheets

U.S. PATENT DOCUMENTS

| | | | |
|---|---|---|---|
| 5,835,756 A | 11/1998 | Caccavale | 395/601 |
| 5,835,943 A | 11/1998 | Yohe et al. | 711/118 |
| 5,844,887 A | 12/1998 | Oren et al. | 370/218 |
| 5,845,280 A | 12/1998 | Treadwell, III et al. | 707/8 |
| 5,845,324 A | 12/1998 | White et al. | 711/128 |
| 5,852,717 A | 12/1998 | Bhide et al. | 395/200.33 |
| 5,864,854 A | 1/1999 | Boyle | 707/10 |
| 5,873,100 A | 2/1999 | Adams et al. | 707/204 |
| 5,878,218 A | 3/1999 | Maddalozzo, Jr. et al. | 395/200.43 |
| 5,881,229 A | 3/1999 | Singh et al. | 395/200.33 |
| 5,889,775 A | 3/1999 | Sawicz et al. | 370/360 |
| 5,918,244 A | 6/1999 | Percival | 711/119 |
| 5,924,864 A | 7/1999 | Loge et al. | 433/118 |
| 5,930,253 A | 7/1999 | Brueckheimer et al. | 370/395 |
| 5,933,607 A | 8/1999 | Tate et al. | 395/200.7 |
| 5,933,849 A | 8/1999 | Srbljic et al. | 711/118 |
| 5,944,780 A | 8/1999 | Chase et al. | 709/201 |
| 5,944,789 A | 8/1999 | Tzelnic et al. | 709/214 |
| 5,978,841 A | 11/1999 | Berger | 709/217 |
| 5,978,951 A | 11/1999 | Lawler et al. | 714/758 |
| 5,987,223 A | 11/1999 | Narukawa et al. | 395/109 |
| 5,991,810 A | 11/1999 | Shapiro et al. | 709/229 |
| 6,041,058 A | 3/2000 | Flanders et al. | 370/401 |
| 6,044,406 A | 3/2000 | Barkey et al. | 709/235 |
| 6,058,116 A * | 5/2000 | Hiscock et al. | 370/401 |
| 6,081,883 A | 6/2000 | Popelka et al. | 712/28 |
| 6,085,234 A | 7/2000 | Pitts et al. | 709/217 |
| 6,098,096 A | 8/2000 | Tsirigotis et al. | 709/213 |
| 6,105,062 A | 8/2000 | Andrews et al. | 709/223 |
| 6,128,306 A | 10/2000 | Simpson et al. | 370/412 |
| 6,138,209 A | 10/2000 | Krolak et al. | 711/128 |
| 6,147,976 A | 11/2000 | Shand et al. | 370/254 |
| 6,205,450 B1 | 3/2001 | Kanome | 707/203 |
| 6,243,358 B1 | 6/2001 | Monin | 370/229 |
| 6,252,514 B1 * | 6/2001 | Nolan et al. | 340/686.4 |
| 6,289,386 B1 | 9/2001 | Vangemert | 709/232 |
| 6,332,198 B1 * | 12/2001 | Simons et al. | 714/6 |
| 6,361,343 B1 * | 3/2002 | Daskalakis et al. | 439/327 |
| 6,400,730 B1 | 6/2002 | Latif et al. | 370/466 |
| 6,424,657 B1 | 7/2002 | Voit et al. | 370/412 |
| 6,438,705 B1 | 8/2002 | Chao et al. | 714/4 |
| 6,457,048 B2 | 9/2002 | Sondur et al. | 709/220 |
| 6,470,013 B1 | 10/2002 | Barach et al. | 370/392 |
| 6,484,209 B1 | 11/2002 | Momirov | 709/238 |
| 6,499,064 B1 | 12/2002 | Carlson et al. | 709/316 |
| 6,532,501 B1 | 3/2003 | McCracken | 710/52 |
| 6,561,836 B1 * | 5/2003 | Marshall et al. | 439/378 |
| 6,584,101 B2 | 6/2003 | Hagglund et al. | 370/389 |
| 6,594,701 B1 | 7/2003 | Forin | 709/232 |
| 6,597,689 B1 | 7/2003 | Chiu et al. | 370/354 |
| 6,597,699 B1 | 7/2003 | Ayres | 370/400 |
| 6,601,186 B1 * | 7/2003 | Fox et al. | 714/4 |
| 6,615,271 B1 | 9/2003 | Lauck et al. | 709/232 |
| 6,629,147 B1 * | 9/2003 | Grow | 709/236 |
| 6,654,895 B1 | 11/2003 | Henkhaus et al. | 713/320 |
| 6,657,962 B1 | 12/2003 | Barri et al. | 370/235 |
| 6,662,219 B1 | 12/2003 | Nishanov et al. | 709/220 |
| 6,674,756 B1 | 1/2004 | Rao et al. | 370/395.21 |
| 6,687,247 B1 | 2/2004 | Wilford et al. | 370/392 |
| 6,704,318 B1 | 3/2004 | Stuart et al. | 370/403 |
| 6,721,818 B1 | 4/2004 | Nakamura | 710/9 |
| 6,731,644 B1 | 5/2004 | Epps et al. | 370/412 |
| 6,731,832 B2 * | 5/2004 | Alvarez et al. | 385/16 |
| 6,735,174 B1 | 5/2004 | Hefty et al. | 370/235 |
| 6,747,949 B1 | 6/2004 | Futral | 370/231 |
| 6,754,206 B1 | 6/2004 | Nattkemper et al. | 370/369 |
| 6,757,791 B1 | 6/2004 | O'Grady et al. | 711/154 |
| 6,758,241 B1 | 7/2004 | Pfund et al. | 137/596 |
| 6,760,339 B1 * | 7/2004 | Noel et al. | 370/401 |
| 6,762,995 B1 | 7/2004 | Drummond-Murray et al. | 370/229 |
| 6,765,871 B1 | 7/2004 | Knoebel et al. | 370/231 |
| 6,765,919 B1 | 7/2004 | Banks et al. | 370/401 |
| 6,792,507 B2 | 9/2004 | Chiou et al. | 711/119 |
| 6,822,957 B1 | 11/2004 | Schuster et al. | 370/389 |
| 6,829,237 B2 * | 12/2004 | Carson et al. | 370/386 |
| 6,839,750 B1 | 1/2005 | Bauer et al. | 709/223 |
| 6,845,431 B2 | 1/2005 | Camble et al. | 711/152 |
| 6,847,647 B1 | 1/2005 | Wrenn | 370/395.32 |
| 6,850,531 B1 | 2/2005 | Rao et al. | 370/401 |
| 6,865,602 B1 | 3/2005 | Nijemcevic et al. | 709/223 |
| 6,876,663 B2 | 4/2005 | Johnson et al. | 370/416 |
| 6,876,668 B1 | 4/2005 | Chawla et al. | 370/468 |
| 6,879,559 B1 * | 4/2005 | Blackmon et al. | 370/225 |
| 6,889,245 B2 | 5/2005 | Taylor et al. | 709/203 |
| 6,931,211 B2 * | 8/2005 | English et al. | 398/164 |
| 6,938,084 B2 | 8/2005 | Gamache et al. | 709/226 |
| 6,944,829 B2 | 9/2005 | Dando | 715/798 |
| 6,954,463 B1 * | 10/2005 | Ma et al. | 370/401 |
| 6,973,229 B1 * | 12/2005 | Tzathas et al. | 385/16 |
| 6,980,515 B1 | 12/2005 | Schunk et al. | 370/230.1 |
| 6,983,303 B2 | 1/2006 | Pellegrino et al. | 709/203 |
| 6,985,490 B2 | 1/2006 | Czeiger et al. | 370/401 |
| 6,988,149 B2 | 1/2006 | Odenwald | 709/250 |
| 7,006,438 B2 | 2/2006 | West et al. | 370/231 |
| 7,010,715 B2 * | 3/2006 | Barbas et al. | 714/4 |
| 7,013,084 B2 * | 3/2006 | Battou et al. | 398/45 |
| 7,016,365 B1 * | 3/2006 | Grow et al. | 370/413 |
| 7,035,212 B1 | 4/2006 | Mittal et al. | 370/230 |
| 7,058,010 B2 * | 6/2006 | Chidambaran et al. | 370/218 |
| 7,079,485 B1 | 7/2006 | Lau et al. | 370/229 |
| 7,085,237 B1 * | 8/2006 | Teodorescu | 370/242 |
| 7,110,353 B1 * | 9/2006 | Deschaine et al. | 370/219 |
| 7,190,695 B2 | 3/2007 | Schaub et al. | 370/392 |
| 7,307,995 B1 * | 12/2007 | Iyer et al. | 370/395.32 |
| 2001/0023443 A1 | 9/2001 | Fichou et al. | 709/227 |
| 2001/0037435 A1 | 11/2001 | Van Doren | 711/153 |
| 2001/0043564 A1 | 11/2001 | Bloch et al. | 370/230 |
| 2002/0004842 A1 | 1/2002 | Ghose et al. | 709/235 |
| 2002/0010790 A1 | 1/2002 | Ellis et al. | 709/238 |
| 2002/0012344 A1 | 1/2002 | Johnson et al. | 370/389 |
| 2002/0019958 A1 * | 2/2002 | Cantwell et al. | 714/11 |
| 2002/0024953 A1 | 2/2002 | Davis et al. | 370/395.1 |
| 2002/0034178 A1 | 3/2002 | Schmidt et al. | 370/386 |
| 2002/0071439 A1 | 6/2002 | Reeves et al. | 370/400 |
| 2002/0078299 A1 | 6/2002 | Chiou et al. | 711/119 |
| 2002/0103921 A1 | 8/2002 | Nair et al. | 709/232 |
| 2002/0118682 A1 | 8/2002 | Choe | 370/395.3 |
| 2002/0165962 A1 * | 11/2002 | Alvarez et al. | 709/226 |
| 2002/0176131 A1 * | 11/2002 | Walters et al. | 359/118 |
| 2002/0186703 A1 | 12/2002 | West et al. | 370/413 |
| 2002/0188786 A1 | 12/2002 | Barrow et al. | 710/300 |
| 2003/0002506 A1 | 1/2003 | Moriwaki et al. | 370/392 |
| 2003/0012204 A1 | 1/2003 | Czeiger et al. | 370/401 |
| 2003/0014540 A1 | 1/2003 | Sultan et al. | 709/240 |
| 2003/0026267 A1 | 2/2003 | Oberman et al. | 370/397 |
| 2003/0033346 A1 | 2/2003 | Carlson et al. | 709/104 |
| 2003/0037022 A1 | 2/2003 | Adya et al. | 707/1 |
| 2003/0037177 A1 | 2/2003 | Sutton et al. | 709/316 |
| 2003/0048792 A1 | 3/2003 | Xu et al. | 370/400 |
| 2003/0063348 A1 | 4/2003 | Posey, Jr. | 359/139 |
| 2003/0074449 A1 | 4/2003 | Smith et al. | 709/226 |
| 2003/0084219 A1 | 5/2003 | Yao et al. | 710/300 |
| 2003/0091267 A1 * | 5/2003 | Alvarez et al. | 385/16 |
| 2003/0093541 A1 | 5/2003 | Lolayekar et al. | 709/230 |
| 2003/0093567 A1 | 5/2003 | Lolayekar et al. | 709/246 |
| 2003/0097439 A1 | 5/2003 | Strayer et al. | 709/224 |
| 2003/0097445 A1 | 5/2003 | Todd et al. | 709/226 |
| 2003/0101426 A1 * | 5/2003 | Sarkinen et al. | 716/12 |
| 2003/0103500 A1 * | 6/2003 | Menon et al. | 370/389 |
| 2003/0126223 A1 | 7/2003 | Jenne et al. | 709/212 |
| 2003/0126280 A1 | 7/2003 | Hawkins et al. | 709/234 |

| | | |
|---|---|---|
| 2003/0126297 A1 | 7/2003 | Olarig et al. ............... 709/250 |
| 2003/0128703 A1 | 7/2003 | Zhao et al. ................. 370/392 |
| 2003/0152182 A1 | 8/2003 | Pai et al. .................... 375/372 |
| 2003/0154301 A1 | 8/2003 | McEachern et al. ......... 709/237 |
| 2003/0163555 A1 | 8/2003 | Battou et al. ............... 709/223 |
| 2003/0195956 A1 | 10/2003 | Bramhall et al. ............ 709/223 |
| 2003/0198231 A1 | 10/2003 | Kalkunte et al. ....... 370/395.31 |
| 2003/0202520 A1 | 10/2003 | Witkowski et al. .......... 370/400 |
| 2005/0018619 A1 | 1/2005 | Banks et al. ................ 370/254 |
| 2005/0018709 A1 | 1/2005 | Barrow et al. ............... 370/465 |
| 2005/0044354 A1 | 2/2005 | Hagerman .................... 7/160 |
| 2005/0243734 A1 | 11/2005 | Nemirovsky et al. ........ 370/252 |

OTHER PUBLICATIONS

U.S. Appl. No. 10/117,266 entitled "System and Method for Guarnateed Link Layer Flow Control," filed Apr. 5, 2002, Hani Ajus et al.

U.S. Appl. No. 10/117,638 entitled "Fibre Channel Implementation Using Network Processors," filed Apr. 5, 2002, Yao Hawkins et al.

U.S. Appl. No. 10/117,418 entitled "System and Method for Linking a Plurality of Network Switches," filed Apr. 5, 2002, Ram Iyer et al.

U.S. Appl. No. 10/117,290 entitled "Method and System for Reduced Distributed Event Handling in a Network Environment," filed Apr. 5, 2002, Huang Ruotao et al.

"Microsoft Computer Dictionary: Fifth Edition"; Microsoft Press; pp. 3, 2002.

N. Lynch et al.; "The Data Link Layer: Two Impossibility Results."; Proceedings of the Seventh Annual ACM Symposium on Principles of Distributed Computing; ACM Press; pp. 149-170, Jan. 1988.

J. Kim et al.; "Bandwidth Allocation in Wireless Networks with Guaranteed Packet-Loss Performance"; IEEE/ACM TRansactions on Networking, vol. 8, No. 3; pp. 337-349, Jun. 2000.

A. Banerjea et al.; "Fault Recovery For Guaranteed Performance Communications Connections", IEEE/ACM Transactions on Networking, vol. 7, No. 5; pp. 653-668, Oct. 1999.

P. Newman et al.; "IP Switching-ATM Under IP"; IEEE/ACM Transactions on Networking, vol. 6, No. 2; pp. 117-129, Apr. 1998

Mary Baker et al., "The Recovery Box: Using Fast Recovery to Provide High Availability in the UNIX Environment," *Summer '92 USENIX* (pp. 31-43), Jun 8, 1992.

George Candea et al., "Microreboot—A Technique for Cheap Recovery," *Computer Systems Lab*, Stanford University, http://swig.stanford.edu/~candea/papers/microreboot/html/index.html (31 pages), Dec. 1, 2004.

* cited by examiner

| Coupling Field A | | | | Coupling Field B | | | |
|---|---|---|---|---|---|---|---|
| LC | LC port | SF port | SF | LC | LC port | SF port | SF |
| 0 | CH0 CH4 | CH0 CH32 | 0 | 0 | CH2 CH6 | CH16 CH48 | 0 |
| 0 | CH8 CH12 | CH0 CH32 | 1 | 0 | CH10 CH14 | CH16 CH48 | 1 |
| 0 | CH16 CH20 | CH0 CH32 | 2 | 0 | CH18 CH22 | CH16 CH48 | 2 |
| 1 | CH0 CH4 | CH1 CH33 | 0 | 1 | CH2 CH6 | CH17 CH49 | 0 |
| 1 | CH8 CH12 | CH1 CH33 | 1 | 1 | CH10 CH14 | CH17 CH49 | 1 |
| 1 | CH16 CH20 | CH1 CH33 | 2 | 1 | CH18 CH22 | CH17 CH49 | 2 |
| 2 | CH0 CH4 | CH2 CH34 | 0 | 2 | CH2 CH6 | CH18 CH50 | 0 |
| 2 | CH8 CH12 | CH2 CH34 | 1 | 2 | CH10 CH14 | CH18 CH50 | 1 |
| 2 | CH16 CH20 | CH2 CH34 | 2 | 2 | CH18 CH22 | CH18 CH50 | 2 |
| 3 | CH0 CH4 | CH3 CH35 | 0 | 3 | CH2 CH6 | CH19 CH51 | 0 |
| 3 | CH8 CH12 | CH3 CH35 | 1 | 3 | CH10 CH14 | CH19 CH51 | 1 |
| 3 | CH16 CH20 | CH3 CH35 | 2 | 3 | CH18 CH22 | CH19 CH51 | 2 |
| 4 | CH0 CH4 | CH4 CH36 | 0 | 4 | CH2 CH6 | CH20 CH52 | 0 |
| 4 | CH8 CH12 | CH4 CH36 | 1 | 4 | CH10 CH14 | CH20 CH52 | 1 |
| 4 | CH16 CH20 | CH4 CH36 | 2 | 4 | CH18 CH22 | CH20 CH52 | 2 |
| 5 | CH0 CH4 | CH5 CH37 | 0 | 5 | CH2 CH6 | CH21 CH53 | 0 |
| 5 | CH8 CH12 | CH5 CH37 | 1 | 5 | CH10 CH14 | CH21 CH53 | 1 |
| 5 | CH16 CH20 | CH5 CH37 | 2 | 5 | CH18 CH22 | CH21 CH53 | 2 |
| 6 | CH0 CH4 | CH6 CH38 | 0 | 6 | CH2 CH6 | CH22 CH54 | 0 |
| 6 | CH8 CH12 | CH6 CH38 | 1 | 6 | CH10 CH14 | CH22 CH54 | 1 |
| 6 | CH16 CH20 | CH6 CH38 | 2 | 6 | CH18 CH22 | CH22 CH54 | 2 |
| 7 | CH0 CH4 | CH7 CH39 | 0 | 7 | CH2 CH6 | CH23 CH55 | 0 |
| 7 | CH8 CH12 | CH7 CH39 | 1 | 7 | CH10 CH14 | CH23 CH55 | 1 |
| 7 | CH16 CH20 | CH7 CH39 | 2 | 7 | CH18 CH22 | CH23 CH55 | 2 |

SYSTEM AND METHOD FOR EXPANSION OF COMPUTER NETWORK SWITCHING SYSTEM WITHOUT DISRUPTION THEREOF

CROSS-REFERENCE TO RELATED APPLICATIONS

This application is related to U.S. patent application Ser. No. 09/738,960 titled "Caching System and Method for a Network Storage System" by Lin-Sheng Chiou, Mike Witkowski, Hawkins Yao, Cheh-Suei Yang, and Sompong Paul Olarig, which was filed on Dec. 14, 2000 and which is incorporated herein by reference in its entirety for all purposes; U.S. patent application Ser. No. 10/015,047 titled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; U.S. patent application Ser. No. 10/039,190 titled "Network Processor Interface System" by Sompong Paul Olarig, Mark Lyndon Oelke, and John E. Jenne, which was filed on Dec. 31, 2001, and which is incorporated herein by reference in its entirety for all purposes; U.S. patent application Ser. No. 10/039,189 titled "Xon/Xoff Flow Control for Computer Network" by Hawkins Yao, John E. Jenne, and Mark Lyndon Oelke, which was filed on Dec. 31, 2001, and which is incorporated herein by reference in its entirety for all purposes; and U.S. patent application Ser. No. 10/039,184 titled "Buffer to Buffer Flow Control for Computer Network" by John E. Jenne, Mark Lyndon Oelke and Sompong Paul Olarig, which was filed on Dec. 31, 2001, and which is incorporated herein by reference in its entirety for all purposes. This application is also related to the following four U.S. patent applications which are being filed concurrently: U.S. patent application Ser. No. 10/117,418, entitled "System and Method for Linking a Plurality of Network Switches," by Ram Ganesan Iyer, Hawkins Yao and Michael Witkowski, and which is incorporated herein by reference in its entirety for all purposes; U.S. patent application Ser. No. 10/117,266, entitled "System and Method for Guaranteed Link Layer Flow Control," by Hani Ajus and Chung Dai, and which is incorporated herein by reference in its entirety for all purposes; U.S. patent application Ser. No. 10/117,638, entitled "Fibre Channel Implementation Using Network Processors," by Hawkins Yao, Richard Gunlock and Po-Wei Tan, and which is incorporated herein by reference in its entirety for all purposes; U.S. patent application Ser. No. 10/117,290, entitled "Method and System for Reduced Distributed Event Handling in a Network Environment," by Ruotao Huang and Ram Ganesan Iyer and which is incorporated herein by reference in its entirety for all purposes.

FIELD OF THE INVENTION

The present invention is related to computer networks. More specifically, the present application is related to a system and method for a scaleable switching fabric for use in computer networks and a method of maintaining and/or upgrading such a system.

BACKGROUND OF THE INVENTION TECHNOLOGY

Current Storage Area Networks (SANs) are designed to carry block storage traffic over predominantly Fibre Channel standard medium and protocols using fabric networks comprising local area networks (LANs). Expansion of SAN fabric networks is limited in that conventional SAN fabric channels cannot be implemented over geographically distant locations. Conventional Fibre Channel architecture is not suitable for WAN/LAN applications. While SCSI and Ethernet may be used to implement a WAN/LAN, these two protocols are not efficient for storage applications. Accordingly, current SAN fabric networks are limited to a single geographic location.

There exist several proposals for moving block storage traffic over SANs built on other networking medium and protocol technologies such as Gigabit Ethernet, ATM/SONET, Infiniband, and the like. Presently, to bridge or interconnect storage data traffic from SANs using one medium/protocol type to another SAN using an incompatible protocol/medium type requires devices and software that perform the necessary protocol/medium translations. These translation devices, hereinafter referred to as "translation bridges," make the necessary translations between incompatible protocol/mediums in order to serve the host computers/servers and storage target devices (the "clients"). Interconnecting heterogeneous SANs that may be easily scaled upward using these translation bridges is very difficult because the translation bridges usually become the bottleneck in speed of data transfer when the clients (servers and/or storage devices) become larger in number. In addition, in a mixed protocol environment and when the number of different protocols increase, the complexity of the software installed on the translation bridges increases, which further impacts performance.

A limitation of the size of SAN fabric networks, in terms of storage capacity, is cost and manpower. In order to expand the storage capacity of a SAN fabric network, storage devices such as disk drives, controllers, fiber channel switches and hubs, and other hardware must be purchased, interconnected and made functionally operable together. Another major, if not primary, expense is the cost of managing a SAN. SAN management requires a lot of manpower for maintenance and planning. For example, as storage capacity grows, issues such as determining server access to storage devices, backup strategy, data replication, data recovery, and other considerations become more complex.

It is desirable that next generation storage network switch systems will have ingress and egress ports that support different protocols and network media so that different types of host computer/servers and storage target devices may be attached directly to the switch system and start communicating with each other without translation overhead. In order to communicate between any two ports, the source and destination ports must be identifiable in both the source and destination protocol. For example, to send a message or frame from a Fibre Channel port to a Gigabit Ethernet port, the destination port needs to appear as a Fibre Channel port to the connected Fibre Channel source, and the source port needs to appear as a Gigabit Ethernet port to the destination port.

Storage Area Network (SAN) and networking products are usually used in mission critical applications and housed in chassis or racks. When a customer wants to expand this system, one or more chassis are added into the existing domain. However, the user has to power down the existing system and reconnect the new chassis into the existing system. Once the new configuration or topology is complete, the user will have to power on the new system. Unfortunately, this upgrade causes system downtime and potentially loss of revenue.

Switches have a limited resource—the switch fabric or routing core. A non-blocking switch must have enough bandwidth to receive traffic at full speed from all ingress ports and direct the traffic to the egress ports without dropping traffic, assuming that the traffic is spread equally across all egress ports and does not congest one of them. Therefore, if all ports connected to the switch have the same data rate, then the switch fabric must have bandwidth greater than the number of ports multiplied by the port speed if it wants to be a non-blocking switch that does not drop traffic.

The problem with existing switches is that the internal switch fabric is fixed in size. If large scalability is desired one has to pay for a large switch fabric that initially is not needed. In present systems a smaller switch has to be replaced when more capacity is needed by a larger switch. This is a disruptive upgrade that causes all nodes connected to the switch to loose connectivity while the upgrade is occurring. In another scenario, multiple smaller switches can be interconnected using lower bandwidth interconnects. However, these interconnects can become congested and limit the throughput of the network.

The majority of the SAN switches are not expandable and typically have a limited number of ports, for example, 16 ports. When a customer needs more than 16 ports two or more of the 16 port switches must be connected together. Unfortunately, to achieve a non-blocking switch in a typical configuration half of the ports on the switch are then used for interconnect purposes.

Some larger switches are based on a chassis design where cards plug into a backplane. This design allows the user to add and remove ports. However, switches are typically designed with a fixed amount of switching bandwidth. The cost of this bandwidth must be amortized over each port. Therefore, if you purchase a switch with large growth potential but start with a modest number of ports you have a higher initial investment than necessary. Also, when a customer fills up the chassis the system still has the problem of expansion. If a chassis supports non-blocking expansion, then it normally has to have twice the required bandwidth.

Furthermore, to expand a system according to the prior art, the system usually has to be shut down. Depending on the design of the system, there might be a significant time gap between the shutdown and the power up of the expanded system due to reconfiguration time and manual labor that has to be performed. This will cause significant loss of revenue during down time.

Thus, there is a demand for a more user friendly system reducing the downtime and overall cost of a network switch fabric system.

SUMMARY OF THE INVENTION

The invention overcomes the above-identified problems as well as other shortcomings and deficiencies of existing technologies by providing a storage network device that performs a multiplicity of functions and has a multiplicity of port types to allow it to connect to a variety of network types (e.g. Fibre Channel, Gigabit Ethernet, etc.) is easily maintainable and/or can be easily upgraded with either no or a minimum downtime.

A primary function of the invention is to act as a storage network switch where frames are switched from port to port. However, because of its architecture, the present invention has the ability to perform many additional functions that take advantage of its high performance, highly scaleable, and highly programmable infrastructure. The switch architecture of the present invention can be comprised of: 1) a Switch Fabric Subsystem, 2) I/O Subsystems, 3) Application Subsystems, and 4) System Control Subsystems.

The Switch Fabric Subsystem is a protocol agnostic cell or packet switching infrastructure that provides the high performance and highly scaleable interconnections between the I/O Subsystems and Application Subsystems. It provides primary data paths for network traffic being moved by the switch. The I/O Subsystems provide the actual port connectivity to the external network devices that use the switch to communicate with other external network devices. The I/O Subsystems are part of the data path and are responsible for making the high performance, low level decoding of ingress frames from the external ports; and switching/routing, identifying the destination I/O subsystem for the frame, and queuing the frame for transmission through the Switching Fabric. The I/O Subsystems process packets at the very lowest protocols levels (Data Link and Network Layer of the OSI Model) where fast switching and routing decisions can be made. The Application Subsystems provide the platforms for higher level processing of frames and data streams in the switch system. The Application Subsystems have more advanced programmability and functionality than the I/O Subsystems, but rely on the control and data information provided by the I/O Subsystems to maintain high performance packet throughput. Typical applications that can run on the Application Subsystems are caching, storage virtualization, file serving, and high level protocol conversion. The System Control Subsystems provide the overall management of the storage network switch. Most of the low level switching and routing protocol functions are executed on the System Control Subsystems. In addition, management access functions such as the SNMP agent, web server, telnet server, and the direct command line interface reside on the System Control Subsystems. The hardware and software executing on the System Control Subsystems are responsible for managing the other subsystems in the network storage switch.

The present invention is directed to a switch fabric system comprising a first chassis for receiving a plurality of line cards each having a plurality of ports and at least two switch fabric cards wherein each line card comprises a plurality of link ports for linking the line card with the switch fabric card. Each switch fabric card provides a switching bandwidth. The system comprises a management unit for managing the traffic on the switch fabric cards wherein the management unit removes the traffic from one switch fabric card if the one switch fabric card is to be removed while the other switch fabric card operates and transfers the traffic to the other switch fabric card.

The chassis can comprise slots for at least one switch fabric cards and for at least one line card. A second chassis can be added, wherein each switch fabric card of the first chassis is linkable with a respective switch fabric card of the second chassis. A switch fabric card can comprises a plurality of configurable port switches, wherein in a first mode a port switch comprises m independent switches each switching n link ports and in a second mode the port switch comprises a m/2 switch switching 2n link ports. The system can further comprise a locking mechanism for each switch fabric card and/or for each line card. Furthermore, each switch fabric card can comprises an indicator for indicating that the switch fabric card is ready for removal. The system can comprise a controller coupled with an input request unit for controlling the configuration of each switch fabric card.

In a multi chassis configuration, a first chassis can comprise a switch fabric card for switching at least one set of m link ports and receives at least one set of m/2 link ports from the associated switch fabric card of the second chassis. Furthermore, m/2 link ports of the m link ports are fed through to the associated switch fabric card of the second chassis and the switch fabric card switches at least one set of m/2 link ports of the first chassis combined with at least one set of m/2 link ports of the second chassis. The associated switch fabric cards can be linked by optical link coupling. Again, the first chassis can comprise configurable switch fabric cards operating in a first mode in which each switch switches m/2 link ports from the first chassis and in a second mode each switch switches m link ports from the first and second chassis.

A method of handling data traffic in a switch fabric system comprising a plurality of line cards each having a plurality of ports and at least two switch fabric cards wherein each line card comprises a plurality of link ports for linking the line card with the switch fabric card, comprises the steps of:
  identifying a switch fabric card which has to be replaced;
  removing all data traffic from the switch fabric card and distributing the data traffic on at least one remaining switch fabric card;
  indicating that the switch fabric card is ready for removal;
  removing the switch fabric card;
  inserting a new switch fabric card;
  integrating the new switch fabric card into the switch fabric system.

The switch fabric card can be locked within the system by a locking mechanism and the step of indicating that the switch fabric card is ready for removal can include the step of unlocking the switch fabric card. The step of integrating the new switch fabric card can include the step of locking the new switch fabric card. The plurality of line cards and the switch fabric cards can be included in a first chassis, and the following steps can be included:
  adding a second chassis comprising at least one line card and at least one first multi-chassis switch fabric card;
  replacing the identified switch fabric card with a second multi-chassis switch fabric card linking the first chassis through the first multi-chassis switch fabric card with the second chassis.

Yet another method of expanding a switch fabric system comprising a chassis with a plurality of slots for a plurality of line cards each having a plurality of ports and at least two switch fabric cards wherein each line card comprises a plurality of link ports for linking the line card with the switch fabric card, comprises the steps of:
  identifying a slot for receiving an additional switch fabric card;
  deactivating the slot;
  indicating that the switch fabric card is ready for insertion;
  inserting the additional switch fabric card;
  integrating the new switch fabric card into the switch fabric system.

A slot is locked within the system by a locking mechanism and the step of indicating that the switch fabric card is ready for insertion includes the step of unlocking the slot. The step of integrating the additional switch fabric card can include the step of locking the additional switch fabric card. Furthermore, the method can comprise the steps of:
  identifying a slot for receiving an additional line card;
  deactivating the slot;
  indicating that the line card is ready for insertion;
  inserting the additional line card;
  integrating the new line card into the switch fabric system.

Again, the slot can be locked within the system by a locking mechanism and the step of indicating that the line card is ready for insertion can include the step of unlocking the slot. The step of integrating the additional line card can include the step of locking the additional line card.

Yet another embodiment is a switch fabric card for a switch fabric system having at least a first and a second chassis for receiving a plurality of line cards each having a plurality of ports and a plurality of switch fabric cards wherein each line card comprises a plurality of link ports for linking the line card with the switch fabric card comprising:
  at least one switch for switching a plurality of link ports receiving a first set of link ports from the first chassis and a second set of link ports from a first interface;
  a feed through coupling for coupling at least a second set of link ports to a second interface, wherein the first and the second interface couples with a second switch fabric card in the second chassis. The first and the second interface can be fibre optic interfaces. the system can further comprise a second switch for switching a plurality of link ports receiving a third set of link ports from the first chassis and a fourth set of link ports from the first interface. The feed through coupling can comprise a fifth and a sixth set of link ports to the second interface. Each link port can comprise a transmit line and a receive line. A first multiplexer for coupling the second set of link ports with the second interface or a second multiplexer for coupling the switch with the first interface or the first multiplexer can be provided. The layout of a switch fabric card for the first chassis can be complementary to a layout for a switch fabric card for the second chassis.

Yet another embodiment of the present invention is a switch fabric system comprising a first chassis for receiving a plurality of line cards each having a plurality of ports and at least one switch fabric card wherein each line card comprises a plurality of link ports and a back plane for linking the line cards with the switch fabric card and each switch fabric card provides a switching bandwidth and wherein the system comprises a management unit for managing the traffic on the switch fabric cards wherein the back plane comprises at least one coupling field which can couple the link ports of the line card with the switch fabric cards, the management unit redirects the traffic through existing port couplings if the coupling of at least one coupling field is interrupted. The ports of each line card can be distributed to a plurality of coupling fields and each coupling field can be coupled with all switch fabric cards. The back plane can comprise a line card connector field and a switch fabric card connector field. At least 2n coupling fields can be associated to each line card connector field, wherein n being an integer number greater or equal to one. A first line card connector field and a second line card connector field can be placed to the left and right side of the switch fabric card connector field in the center of the back plane thus creating four quadrants. Thus, each quadrant comprises 2n coupling fields.

A back plane for a switch fabric system for receiving a plurality of line cards each having a plurality of ports and at least one switch fabric card wherein each line card comprises a plurality of link ports, comprises at least one coupling field for receiving a loop back connector or a link connector for coupling the link ports of the line card with the switch fabric cards or for coupling with another back plane of another switch fabric system through the link connector. The ports of each line card can be distributed to a plurality of coupling fields and each coupling field is coupled with all switch fabric cards. The back plane can comprise a line card connector field and a switch fabric card connector field. At least 2n coupling fields can be associated to each line card connector field, n being an integer number greater or equal to one. A first line card connector field and a second line card connector field can be placed to the left and right side of the switch fabric card connector field in the center of the back plane thus creating four quadrants, wherein each quadrant comprising the 2n coupling fields.

Yet another method of expanding a first switch fabric system comprising a first chassis for receiving a plurality of line cards each having a plurality of ports and at least one switch fabric card wherein each line card comprises a plurality of link ports and a back plane for linking the line cards with the switch fabric card and each switch fabric card provides a switching bandwidth wherein the back plane comprises at least one coupling field which can couple the link ports of the line card with the switch fabric cards, the management unit redirects the traffic through existing port couplings if the coupling of at least one coupling field is interrupted, the method comprises the steps of:

a) providing a second switch fabric system;
b) de-coupling the at least one coupling field of the first switch fabric system;
c) establishing a link to the second switch fabric system.

The first system can comprise a plurality of pairs of coupling fields, and the method can further comprise the step of repeating steps b) and c) for one of the coupling fields from each pair of coupling fields. The system can comprise a management unit for managing the traffic on the switch fabric cards, and the step of de-coupling can include the step of re-routing the traffic from the de-coupled ports through existing port couplings. The first system can comprise a plurality of pairs of coupling fields, and the method can further comprise the step of repeating steps b) and c) for one of the coupling fields from each pair of coupling fields, wherein the existing port couplings are established through one of the other remaining coupling fields.

BRIEF DESCRIPTION OF THE DRAWINGS

A more complete understanding of the present disclosure and advantages thereof may be acquired by referring to the following description taken in conjunction with the accompanying drawings wherein:

FIG. 12 shows the connections of the coupling in one quadrant according to FIG. 11 when used in a single chassis system;

Figure 1:
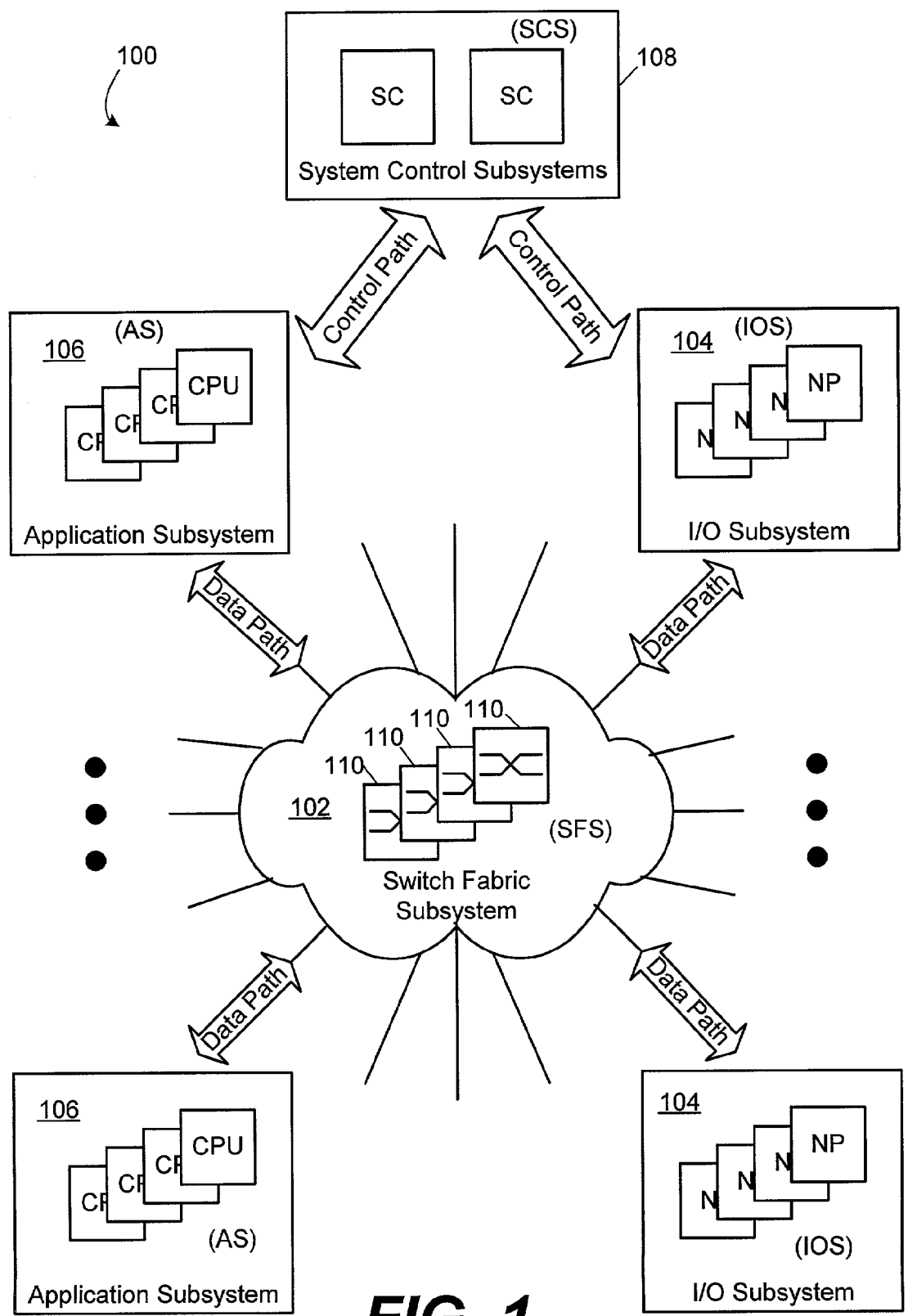
FIG. 1 is a conceptual schematic system architecture of a network storage switch, according to an exemplary embodiment of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The present invention is directed to a storage network device that performs a multiplicity of functions and has a multiplicity of port types to allow it to connect to a variety of network types (e.g. Fibre Channel, Gigabit Ethernet, etc.). A primary function of the invention is to act as a storage network switch wherein frames are switched from port to port. However, because of its architecture, the present invention has the ability to perform many additional functions that take advantage of its high performance, highly scaleable, and highly programmable infrastructure.

The following description of the exemplary embodiments of the present invention contains a number of technical terms using abbreviations and/or acronyms which are defined herein and used hereinafter:

| | |
|---|---|
| AP | Application Processor |
| AS | Application Subsystem |
| BMC | Buffer Management Coprocessor |
| EMU | Environmental Monitoring Units |
| FC | Fibre Channel |
| FCP | Fabric Coprocessor |
| FIOC | Fabric I/O Controller |
| FP | Fabric Processor |
| Gb/s | gigabits per second |
| I/O | input-output |
| IOP | Input/Output Processor |
| IOS | I/O Subsystem |
| IPC | Interprocessor Communications Controllers |
| LCP | Line Card Processor |
| MAC | Media Access Control |
| North Bridge | combination memory controller and I/O bus bridge |
| NP | Network Processor(s) |
| PAB | Port Aggregation Bridge |
| PCI | Peripheral Component Interconnect |
| QMC | queue management coprocessor |
| SAN | storage area network |
| SCC | System Control Cards |
| SCP | System Control Processor |
| SCS | System Control Subsystem |
| SERDES | external serializer/deserializer |
| SFI | Switch Fabric Interface |
| SFS | Switch Fabric Subsystem |
| TLC | table lookup coprocessor |
| XP | executive coprocessor |

Referring now to the drawings, the details of an exemplary specific embodiment of the invention is schematically illustrated. Like elements in the drawings will be represented by like numbers, and similar elements will be represented by like numbers with a different lower case letter suffix.

FIG. 1 illustrates a conceptual schematic system architecture of a storage network switch, according to an exemplary embodiment of the present invention. The Storage Network Switch, generally represented by the numeral 100, comprises: 1) a Switch Fabric Subsystem 102, 2) I/O Subsystems 104, 3) Application Subsystems 106, and 4) System Control Subsystems 108. The Switch Fabric Subsystem (SFS) 102 is a protocol agnostic cell or packet switching infrastructure that provides the high performance and highly scaleable interconnections between the I/O Subsystems 104 and Application Subsystems 106. It provides primary data paths for network traffic being moved by the Storage Network Switch 100. The I/O Subsystems 104 provide the actual port connectivity to the external network devices that use the Storage Network Switch 100 to communicate with other external network devices (not illustrated). The I/O Subsystems 104 are part of the data path and are responsible for making the high performance, low level decoding of ingress frames from the external ports; and switching/routing, identifying the destination I/O Subsystem 104 for the frame, and queuing the frame for transmission through the Switch Fabric Subsystem 102. The I/O Subsystems 104 process packets at the very lowest protocols levels (Data Link and Network Layer of the OSI Model) where fast switching and routing decisions can be made. The Application Subsystems 106 provide the platforms for higher level processing of frames and data streams in the Storage Network Switch 100. The Application Subsystems 106 have more advanced programmability and functionality than the I/O Subsystems 104, but rely on the control and data information provided by the I/O Subsystems 104 to maintain high performance packet throughput. Typical applications that can run on the Application Subsystems 106 are caching, storage virtualization, file serving, and high level protocol conversion. The System Control Subsystems 108 provide the overall management of the Storage Network Switch 100. Most of the low level switching and routing protocol functions are executed on the System Control Subsystems 108. In addition, management access functions such as the SNMP agent, web server, telnet server, and the direct command line interface reside on the System Control Subsystems 108. The hardware and software executing on the System Control Subsystems 108 are responsible for managing the other subsystems (104, 106) in the Storage Network Switch 100.

The Switch Fabric Subsystem (SFS) 102 is responsible for routing the plurality of data channels from and to the respective ingress and egress ports of each line card. Each line card comprises a plurality of links for coupling with the switches included in the switch fabric cards. These links can be optical or electrical. Each switch in a switch fabric card is linked through with all line cards through one of these links which are hereinafter called ports. Each link usually consists of a separate receiving and transmitting line. Thus, if a system comprises, for example, 16 line cards, each switch must be able to receive 16 links. Such a coupling is hereinafter called a 16-port link. To provide sufficient bandwidth, each line card provides a plurality of links. Thus, for example 24 high speed links per line card can be provided. To provide the maximum bandwidth, 12 crossbar switches must be implemented/populated. In one embodiment of the present invention, for example, 3 switch fabric cards are provided wherein each switch fabric card comprises 4 independent crossbar switches, thus, providing 12 independent crossbar switches. However, if the necessary bandwidth is less than the maximum bandwidth, for example, when only a subset of line cards are installed, only one or two switch fabric cards can be implemented. Even though, this subsystem is usually designed to be highly reliable, some ports can malfunction. The system usually provides enough overhead to reroute the respective data paths by using one of the other switches. However, at some point a switch fabric card might have to be replaced. In addition, the present invention allows to add non-blocking capacity in a modular fashion without forcing the customer to power off their chassis. This allows the customer to grow the size of their switch while still passing traffic.

Figure 2:
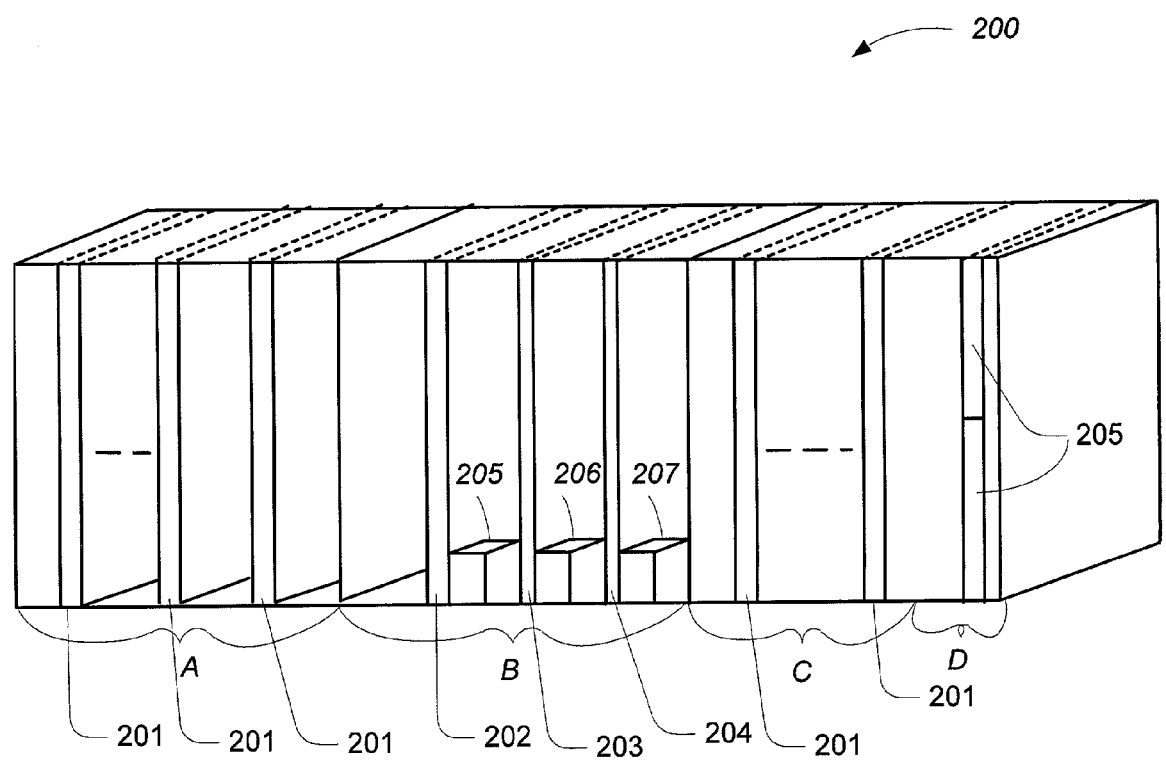
FIG. 2 is chassis for a switch fabric comprising a plurality of line cards and switch fabric cards.

FIG. 2 shows a partial schematic perspective view on an upgradeable chassis for a switch fabric system according to the present invention. Such a chassis comprises essentially four sections A, B, C and D. Sections A and C receive the line cards 201, for example 8 line cards per section and section B receives the switch fabric cards, for example, three switch fabric cards 202, 203, and 204. Section D can receive a system control card 205. To this end, the chassis may have one or more half-slots for providing connections for example, for two half height system controller cards 205. In the embodiment shown in FIG. 2, the two half-slots are occupied by two system controller cards (SC). The system controller cards 205 may include basic system management control function as will be explained in more detail below, such as routing assigning traffic to respective switch fabric cards and other basic system operations. To prevent that the switch fabric cards are removed or inserted without authorization, electrically controlled locking mechanism 205, 206, and 207 can be provided. Similar locking mechanisms can be provided for the line cards. The locking mechanism can be either implemented within the chassis 200 or be incorporated into each card. The locking or release mechanism can further be placed on the front or on the back side of the card/chassis. The function of the locking mechanism will be explained in more detail below. This mechanism can also prevent end users from inadvertently removing the wrong card.

Assuming that every line card 201 provides 10 ingress and egress ports, such a system can be expanded to 16 line cards 201, thus, providing 160 ports. According to the present invention, the system can further be expanded to 320 ports by changing or reconfiguring the switch fabric cards, as will be explained later in more detail. To this end, a second chassis can be added providing space for 16 more line cards 201, thus, expanding the system to 320 ports. The second chassis can be part of the same rack and placed above or below the first chassis or can be placed in a second rack. Each chassis will provide all necessary power supplies and also a ventilation system to maintain an appropriate temperature within the whole chassis. A backplane is provided to couple the switch fabric cards 202, 203, 204 with the respective line cards 201 as will be explained below in more detail.

Figure 3:
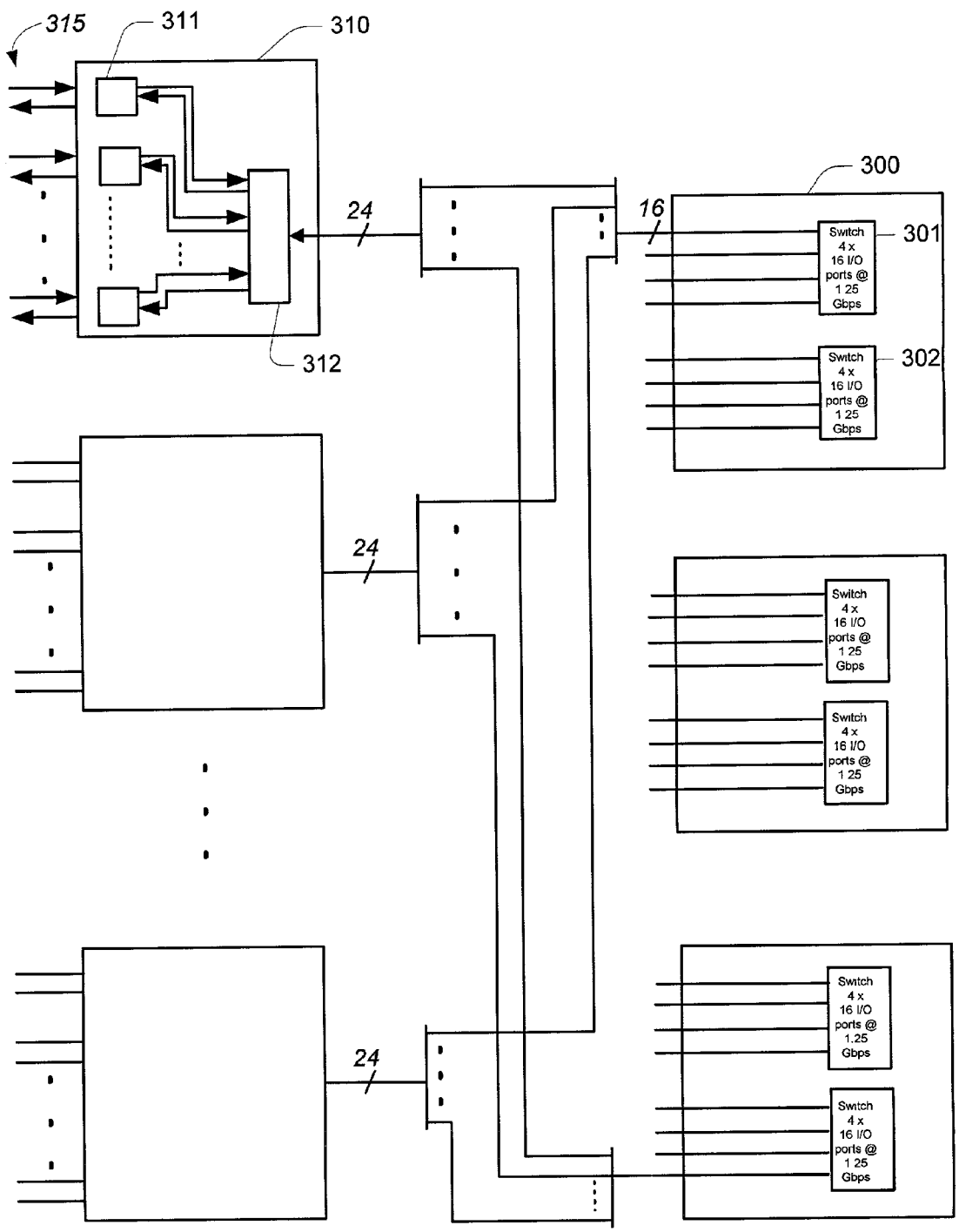
FIG. 3 is a schematic block diagram showing the interconnection of switch fabric cards and line cards according to one embodiment of the invention.

FIG. 3 shows the interconnection as provided by a backplane between the line cards and the switch fabric cards within one chassis according to an exemplary embodiment of the present invention using a maximum of m/2=16 line cards. Each line card 310 comprises, for example, 10 ingress and egress ports 311 coupling external application or I/O subsystems through optical or electrical connections 315. Each line card 310 also comprises a switch fabric interface 312 for coupling the different data paths with the switch fabric cards 300. To this end, for example, 24 1.25 Gbps serial links, each link having separate transmit and receive lines, are connected to the switch fabric. In this embodiment, three switch fabric cards 300 are provided.

Each switch fabric card provides two switch fabric chips 301 and 302 which can be configured in different modes. For example, the switch fabric chip 301, 302 can be configured in a first mode to comprise a single 64-port switch. In a second mode, the chip provides two independent 32-port switches and in a third mode it provides four independent 16-port switches. Each port comprises separate transmit and receive lines per link. In the embodiment shown in FIG. 3, a maximum of 16 line cards 310 can be added to the system. The switch fabric chip 301, 302 are configured in mode 3 to provide four independent 16-port switches. With three switch fabric cards 300 implemented, a total of 24 16-port switches are available. Thus, every link of each line card 310 can be coupled with one link of the 24 16-port switches provided by the three fabric switch cards 300. If less switch fabric cards are implemented the respective ports remain unconnected. Thus, every link of each line card 310 can be coupled with a link from another line card 310 through one of the switches. The system further provides enough redundancy to ensure that no congestion occurs whenever a coupling malfunctions. In case of malfunctioning of a coupling, the system reroutes the data path through one of the remaining functioning couplings.

The present invention takes advantage of the switching and rerouting capabilities of the system. Thus, if only a certain number of line cards 310 are implemented only a certain number of switch fabric cards 300 is needed. In case that the system has to be expanded, an additional switch fabric card 300 and more line cards 310 can be inserted into the chassis. In this embodiment, one chassis can receive up to three switch fabric cards 300 and up to 16 line cards 310. The process of changing and adding line cards and/or switch fabric cards will be explained in more detail below.

Figure 4:
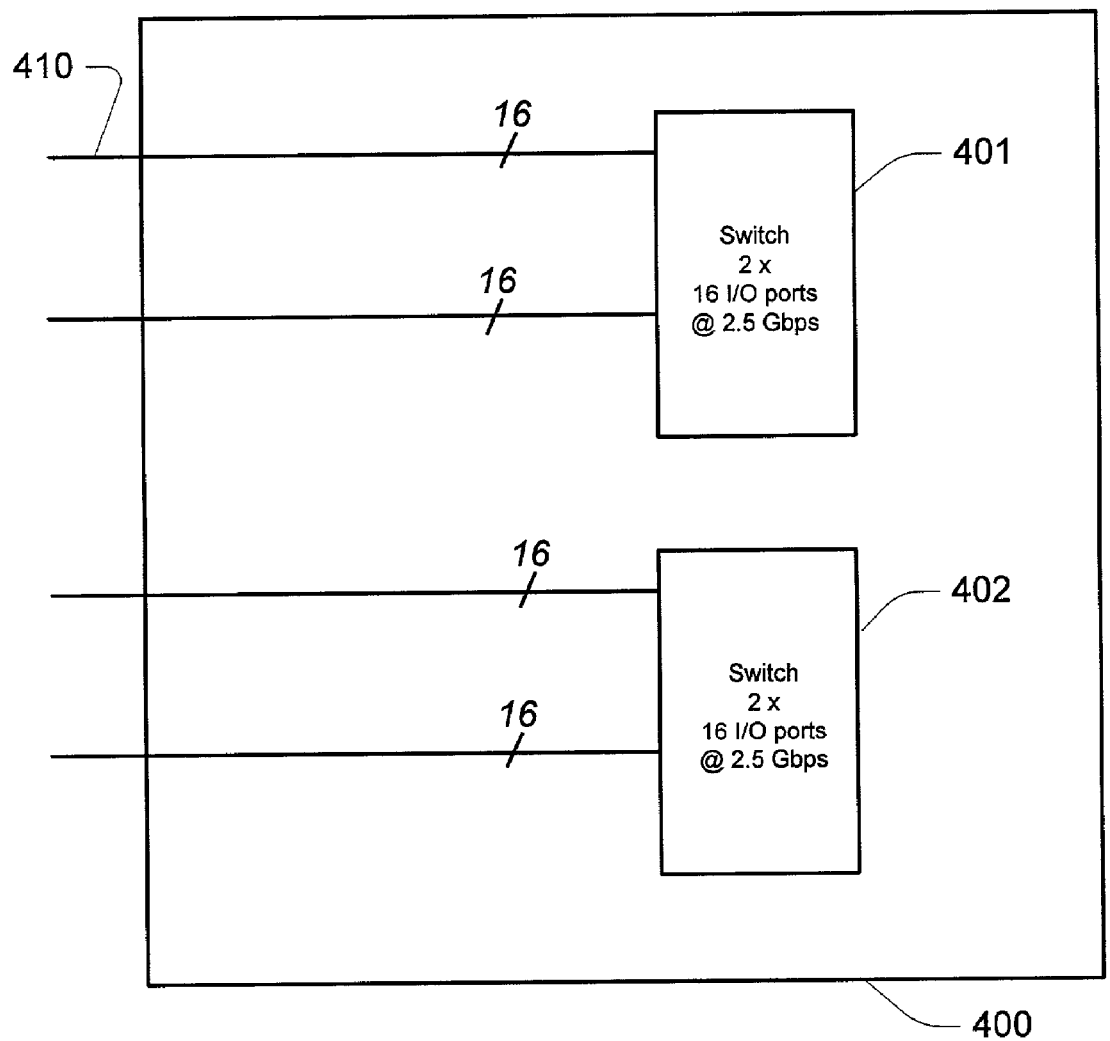
FIG. 4 is a schematic block diagram another embodiment of a switch fabric card.

Another embodiment of the present invention uses a different mode of the switch fabric chips 301, 302. In this embodiment, the switching capacity of each switch fabric is doubled. Instead of 1.25 Gbps, each switch provides a bandwidth of 2.5 Gbps, thus, reducing the number of switches in mode 3 to two 16-port switches and in mode 2 to one 32-port switch. Mode 1 is thus not supported. In this high speed mode, each line card provides only 12 links, each having a bandwidth of 2.5 Gbps. This mode uses less connections between the line cards 310 and the switch fabric cards 300 reducing hardware costs. FIG. 4 shows the respective switch fabric card with two switches 401 and 402 each having two 2.5 Gbps links 410 thus providing four ports.

As mentioned above, according to this embodiment, a maximum of 3 switch fabric cards 300 and 16 line cards 310 can be implemented. Thus, the system is limited to 160 ingress and egress ports as each line card carries 10 ports. However, according to another embodiment of the present invention, using different switch fabric cards, the amount of ports can be doubled. To this end, a second chassis such as shown in FIG. 2 is added within the same rack comprising the first chassis or in a different rack and the switch fabric cards are replaced by multi-chassis switch fabric cards. Depending on how many additional line cards 310 are added to the system one or all switch fabric card 300 have to be replaced by the multi-chassis switch fabric cards.

Figure 5:
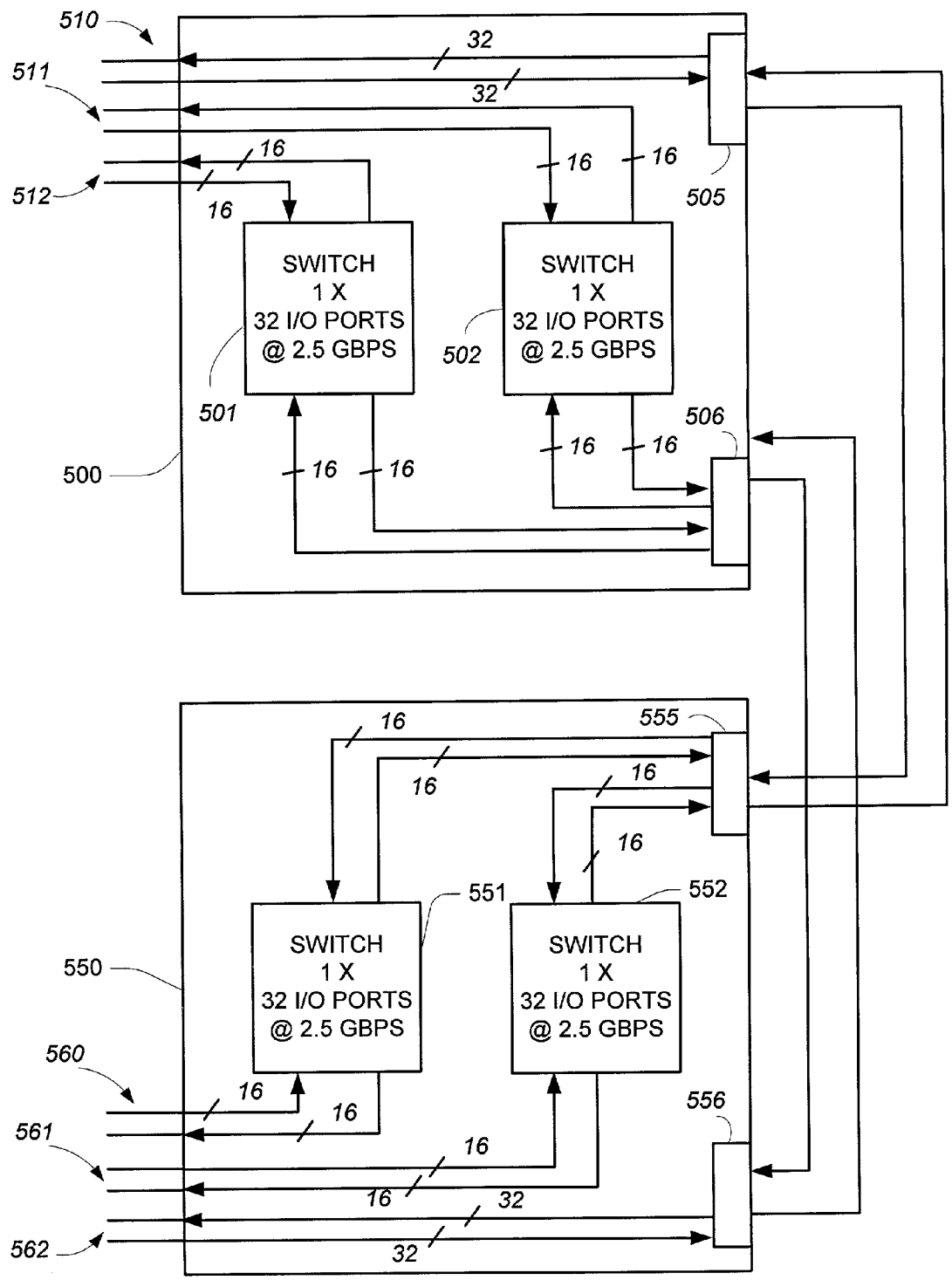
FIG. 5 is a schematic block diagram of yet another embodiment of switch fabric cards.

FIG. 5 shows two different multi-chassis switch fabric cards which can be used to link the two chassis to a common chassis providing twice as many ports as a single chassis. Two different multi-chassis switch fabric cards 500 and 550 are provided. The multi-chassis switch fabric cards 500 and 550 are configured complementary and linked together through special ports. Thus, if a switch fabric card in the first chassis is replaced by one multi-chassis switch fabric card the second chassis needs the complementary multi-chassis switch fabric card to be linked to the first multi-chassis switch fabric card. The first type of multi-chassis switch fabric card 500 comprises a first and a second 16-port link 511 and 512 which are coupled with each switch fabric chip 501 and 502, respectively. In this configuration, for example, the switch fabric chips are configured in mode 2, thus providing one 32-port switch with a bandwidth of 2.5 Gbps. Again, each port comprises separate transmit and receive lines as shown in FIG. 5. As the first chassis comprises 16 line cards only the first 16 ports 0-15 of switch fabric chip 501 and 502 are coupled with 16-port links 511 and 512, respectively. The third and fourth 16-port links are shown as a single 32-port link in FIG. 5.

These two 16-port links 510 which in the single chassis embodiment are also coupled with the switch fabric chips are coupled with a special interface 505, for example, an optical interface. 32-Port link 510 consists as mentioned above of two separate 16-port links, each having 16 transmit and receive lines. Thus, the third and fourth 16-port links are fed through this multi-chassis switch fabric card 500 to the second chassis. The upper 16-port links from line cards 16-32 are coming from a second special interface 506, for example, an optical interface. To this end, the two 16-port links are coupled through the special interface 506 with the upper 16-ports of the respective switch fabric chips 501 and 502.

The second type of multi-chassis switch fabric interface 550 comprises a complementary layout. A first special interface 555 is coupled with the first 16-ports of each switch fabric chip 551 and 552. One link of each line card of the second chassis couples through 16-port links 560 and 561 with one link of the upper ports for line cards 16-32 of switch fabric chip 551 and switch fabric chip 552, respectively. Port 562 again comprises coupling of a third and fourth link for each line card through two 16-port links of the second chassis which are fed through to a second special interface 556. Externally, special interface 505 is coupled with special interface 555 and special interface 506 with special interface 556, for example, through fibre optic cables. Thus, each switch fabric chip 501, 502, 551, and 552 can be coupled with all 32 line cards of the first and the second chassis. If all three switch fabric cards of the first chassis are replaced by a multi-chassis switch fabric card and the respective complementary multi-chassis switch fabric card is inserted into the second chassis and the respective multi-chassis switch fabric cards are linked with their respective complementary multi-chassis card, the system can be expanded to provide twice as many ports, for example, in this exemplary embodiment up to 320 ports. The procedure of expanding a single-chassis switch fabric system to a multi-chassis switch fabric system will be explained in more detail later.

Figure 6:
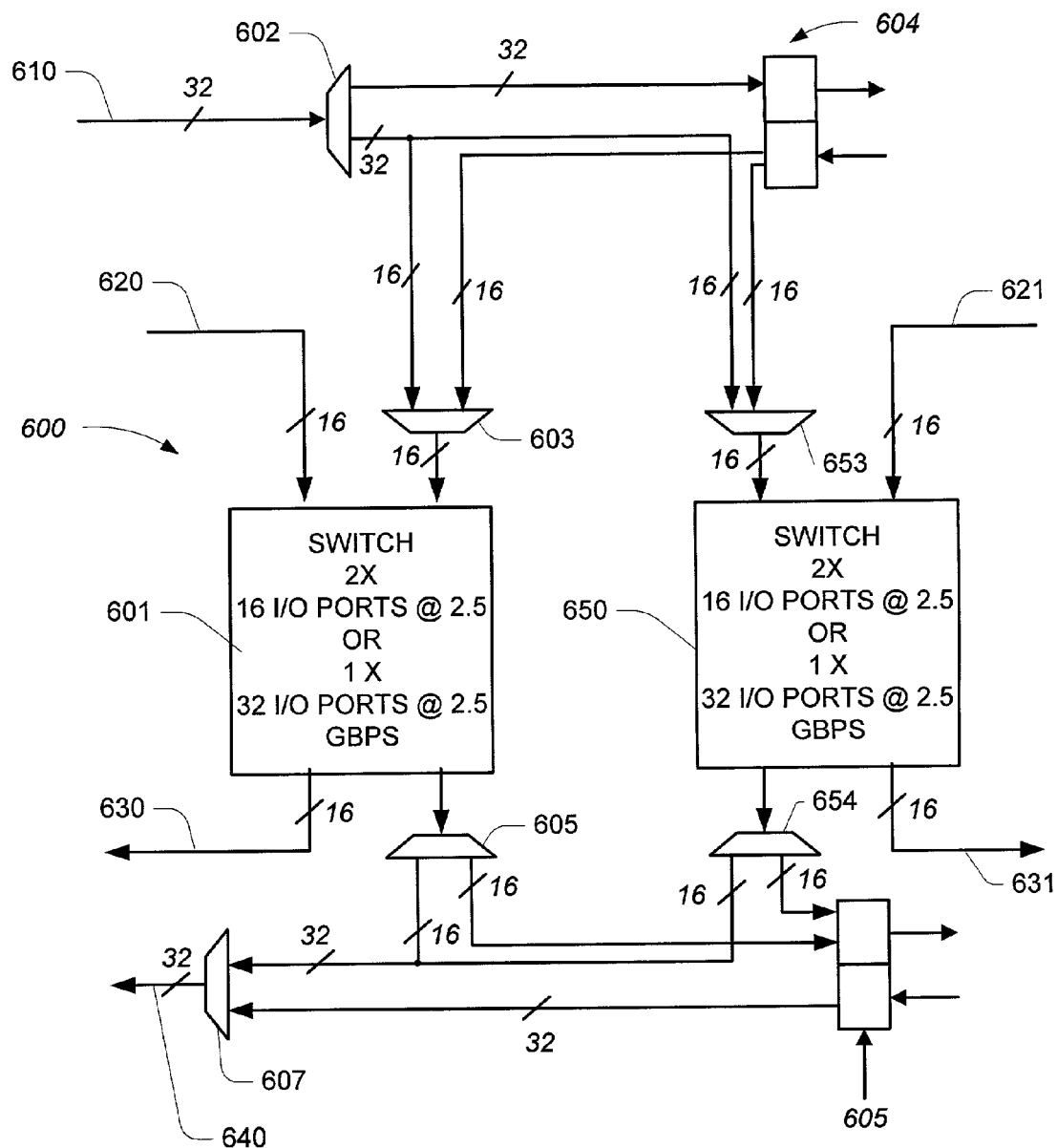
FIG. 6 is a partial schematic block diagram of yet another embodiment of a switch fabric card.

According to another embodiment of the present invention, to avoid replacement of a switch fabric card, in case of an expansion from a single chassis system to a multi-chassis system, a special configurable switch fabric card is provided which can be used in either systems. Such a configurable switch fabric card 600 is shown as a block diagram in FIG. 6. FIG. 6 shows the links in more detail by displaying separate transmit and receive ports. A first switch fabric chip 601 and a second fabric switch 650 each comprise a first and second 16-port link receiving a first 16 pairs of transmit and receive lines 620, 630 and 621, 631 from the line cards of the first chassis. Again, each port has a bandwidth of 2.5 Gbps in this embodiment. A third and fourth input port of switch fabric chips 601 and 650 comprising 16 lines are coupled with the output of a first multiplexer 603 and a second multiplexer 653, respectively. A third multiplexer 602 receives 2 line pairs from each line card, thus, resulting in 32 port links. The first 32-port output of multiplexer 602 is fed to a transmit input of special interface 604. The second 32-port output of multiplexer 602 is split into two and coupled with the first input of multiplexer 603 and of multiplexer 653, respectively. The second inputs of multiplexers 603 and 653 are coupled with the output of the receiver port of special interface 604. Similarly, the second transmitting ports of switch fabric chips 601 and 650 are coupled with inputs of a fourth multiplexer 606 and a fifth multiplexer 654, respectively. The first outputs of multiplexers 606 and 654 are coupled with the transmitter port of a second special interface 605. The second outputs of multiplexer 606 and 654 are combined to a 32-port and fed to the first input of a sixth multiplexer 607 whose second 32-port input is coupled with the receiver port of special interface 605. The output of multiplexer 607 provides two 16-port links 640.

In a first operation mode, the configurable switch fabric card 600 operates similar to the switch fabric cards shown in FIGS. 3 and 4. Multiplexer 602 directs the first set of 16-port links 610 to the input of multiplexer 603 and the second set of 16-port links to multiplexer 653. Switch fabric chips 601 and 650 operate in mode 3, thus, providing two independent 16-port switches each with a bandwidth of 2.5 Gbps. The transmit ports of switch fabric chips 601 and 650 are directed in a similar way to the combined port 640. Multiplexers 606 and 654 direct their 16-port outputs to the 32-port input of multiplexer 607 which is selected to couple 32-port output 640 with this input of multiplexer 607. Thus, each fabric switch chip 601 and 650 switches independently two sets of 16-ports wherein each port comprises a transmit and a receive port.

The second operation mode turns the switch fabric card into a multi-chassis mode. In this mode the switch fabric card operates like multi-chassis switch fabric card 500 of FIG. 5. The lower input ports 0-15 of switch fabric chips 601 and 650 receive the signals from the first set of line cards 0-15 from the first chassis through 16-port link 620 and 621. The combined set of two 16-ports 610 are directed through multiplexer 602 to the 32-port transmitter of special interface 604. The 32-port receiver output of special interface 604 is split into a set of two 16-ports which are coupled through multiplexers 603 and 653, respectively with the upper input ports 16-32 of switch fabric cards 601 and 650. These inputs carry the 16-ports of the upper line cards 16-32 from the second chassis. The switch fabric chips operate in mode 2, thus, providing a single 32-port switch operating with a bandwidth of 2.5 Gbps. Again, the transmitting ports of switch fabric chips 601 and 650 operate in a similar way. The lower ports for line cards 0-15 are provided directly from the first output port of switches 601 and 650 to the 16-port links 630 and 631. Multiplexers 606 and 654 couple the second output ports of switch fabric chips 601 and 650 to the 32-port transmitter of special interface 605. Multiplexer 607 selects the 32-port receiver output of special interface 605 to couple it with the dual 16-port link 640.

If a system with a single chassis and with the configurable switch fabric cards has been acquired, the system can be expanded without replacing any component of the current configuration. To this end, the system control cards (as shown in FIG. 2) will manage the traffic assignment allowing re-routing of traffic and a very flexible re-configuration of the system. As long as the single chassis is providing enough ports, the configurable switch fabric cards operate in the first mode, thus, providing two 2.5 Gbps 16-port switches or four 1.25 Gbps 16-port switches depending on how the system is configured. When all 16 line cards are installed in the first chassis and more ports are needed, a second chassis can be added to the rack. A first configurable switch fabric card 600 is now switched into the second mode and a multi-chassis switch fabric card 550 as shown in FIG. 5 is added. Both, the multi-chassis switch fabric card 550 and the configurable switch fabric card 600 are coupled through their special interfaces according to FIG. 5. As long as the switching capacity is big enough additional line card can be added to the second chassis. With more line cards added to the second chassis, a second and a third multi-chassis switch fabric card 550 might be necessary in the second chassis. If this is necessary, the respective configurable switch fabric card 600 of the first chassis is configured to operate as a multi-chassis switch fabric card 500 and a respective multi-chassis fabric card 550 is added to the second chassis and interconnected with the configurable switch fabric card 600. When all three multi-chassis switch fabric cards 550 are placed into the second chassis, the system can be expanded up to 320 ports with maximum throughput.

In the present exemplary embodiments, each switch fabric device has a switching capacity of approximately 80 Gbps full duplex. For example, 32 ports×2.5 Gbps=80 Gbps per device. Assuming to switch fabric devices per switch fabric card, each switch fabric card can handle approximately 160 Gbps. Each line card provides 10 1 Gbps ports. Thus, each switch fabric device can handle approximately 8 line cards providing 80 1 Gbps ports. As one chassis can accept 16 cards, two switch fabric devices can handle all traffic. Thus, a third switch fabric card adds enough redundancy to the system that one card can be replaced or upgraded while the other two are handling the oncoming traffic of a fully loaded system.

Figure 7:
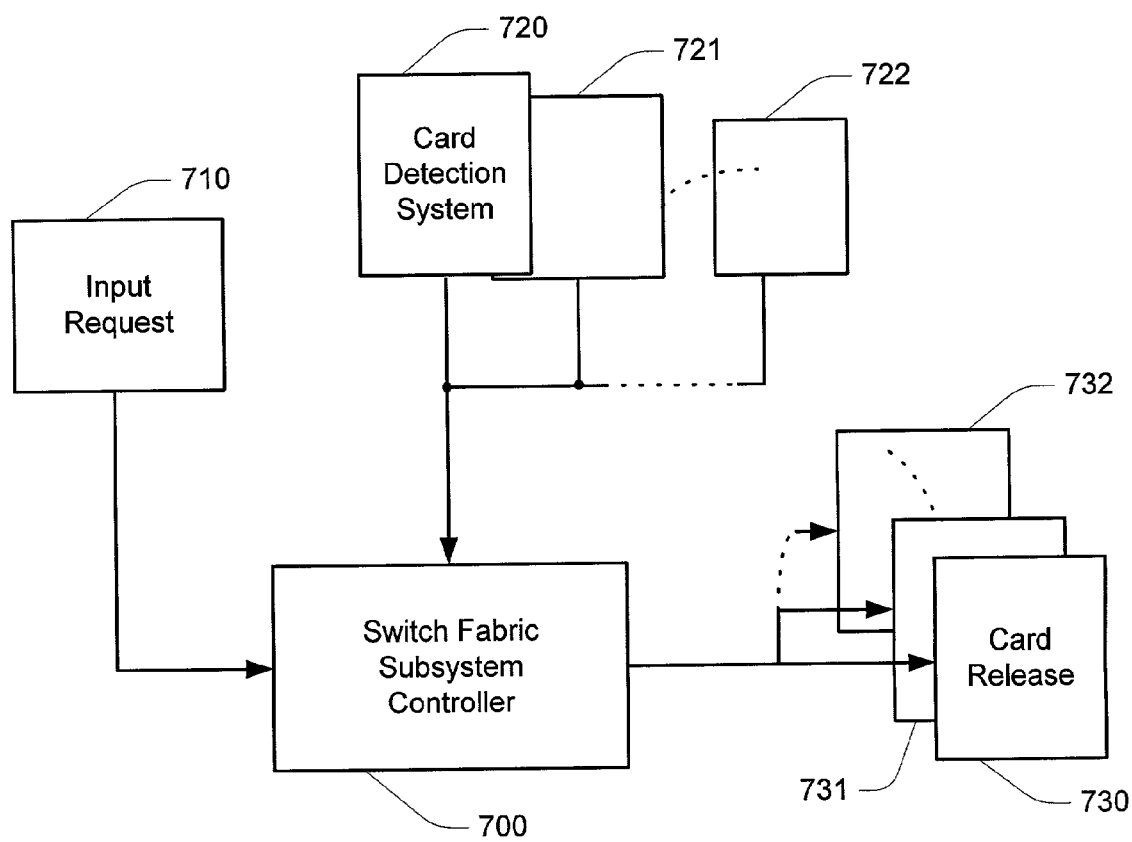
FIG. 7 is block diagram of a control system for handling upgrade and/or maintaining operations within a switch fabric system according to the present invention.

A system according to the present invention can thus be expanded or maintained with no or only a minimum downtime. For example, a system might comprise a rack with a single chassis including one configurable or non-configurable switch fabric card and five line cards providing 50 ports. If the switching capacity is too low, a second switch fabric card and additional line cards can be added. The system allows the user to add any card without shutting down the system. FIG. 7 shows some of the components for handling such a so-called "live-expansion" of a system. A switch fabric subsystem controller 700 receives a live-expansion request from an input device 710. This input device can be a controlling computer station with a screen and a keyboard or respective update buttons associated to each slot of the chassis. Controller 700 is further coupled with card detection devices 720, 721, 722 for each slot of each chassis and optional with release systems 730, 731, 732 for each slot. The release systems 730, 731, 732 can be added to the system to provide additional security. Each release system locks a respective switch fabric or line card in its slot, thus, preventing that a card is accidentally removed. In addition, the locking mechanism of the release system 730, 731, 732 can furthermore prevent that a card is inserted into a chassis without authorization.

When the system has to be expanded, a request is made through input request unit 710. In case of adding an additional card to the system, the respective slot has to be identified and the controller 700 will signal to the user that the system is ready to receive an additional card in the respective slot. To this end, the slots can be configured to be hot-pluggable or the controller can shut down only the respective slot until the card is inserted. When the user indicates to the system through input request unit 710 that the live-expansion has been finished, the system configures the new inserted card and integrates it into the system. Thus, no downtime occurs whenever the system is expanded.

In a second scenario, a malfunctioning switch fabric card has to be replaced. Assuming that the system comprises again a single chassis and is fully loaded, the user indicates through input request unit 710 that the malfunctioning switch fabric card will be exchanged with a new switch fabric card. The system then reroutes all traffic which is still handled by the functioning parts of the respective switch fabric card to the other two switch fabric cards. Once all traffic has been removed from the malfunctioning switch fabric card, controller 700 indicates this to the user and opens the locking mechanism of the respective release system of the slot. The user can then replace the switch fabric card and indicate completion of the exchange to the system. The system then activates and integrates the newly added card into the system.

Again, the slots can be either designed to be hot-pluggable or can be manually deactivated. If the slots are hot-plugable, the request for an exchange or an additional input can be generated automatically. For example, if a card is removed, a special contact or sensor indicates this to the system. The time between indication of the removal and actual disconnection of the card must be long enough to ensure that the card can be shut down during this period by removing all traffic from its switches. To this end, the contacts of the respective connectors can be designed to be long enough that sliding the card out of the respective connectors provides sufficient time. However, each card can also be supplied with indicators, such as LEDs, indicating that the card cannot be removed because a shut down of the card has not been completed yet or because a hot-plug process is controlled by system software. For example, the system software can use the LED to indicate to the user when it is safe to remove the card. This is very similar to hot-plug PCI devices.

A switch integrated at a removing handle of the card can be activated when a user touches the card and signaling to the controller 700 that a card is about to be removed. As long as the respective LED is not lid, either a locking mechanism prevents removing of the card or the user must wait until the proper signal is present to remove the card. Many different solutions for hot-plugable removal or insertion of a card into a slot can be implemented within a system according to the present invention.

Next, a live-expansion of a system with a single chassis to a multi-chassis system will be described. It will be again assumed that the rack comprises a single chassis which is fully loaded with 16 line cards and three configurable switch fabric cards. First, a second chassis is added to the same rack or an additional rack. Next, it will be indicated to the system that a first configurable switch fabric card has to be reconfigured to a multi-chassis card. The system controller 700 then removes all traffic from the respective configurable switch fabric card and transfers this traffic to the remaining two operable configurable switch fabric cards. Then, the respective configurable switch fabric card is reconfigured to be switched into the mode in which it operates as a multi-chassis switch fabric card 500. A respective complementary multi-chassis switch fabric card 550 and additional line cards are added to the second chassis and the two complementary switch fabric cards are interconnected through their special interfaces. A completion of this procedure is then indicated to the system through input request unit 710. The system controller 700 then activates and configures the respective newly added hardware and integrates it into the operating system. More multi-chassis switch fabric cards can be added to the system accordingly.

Figure 8:
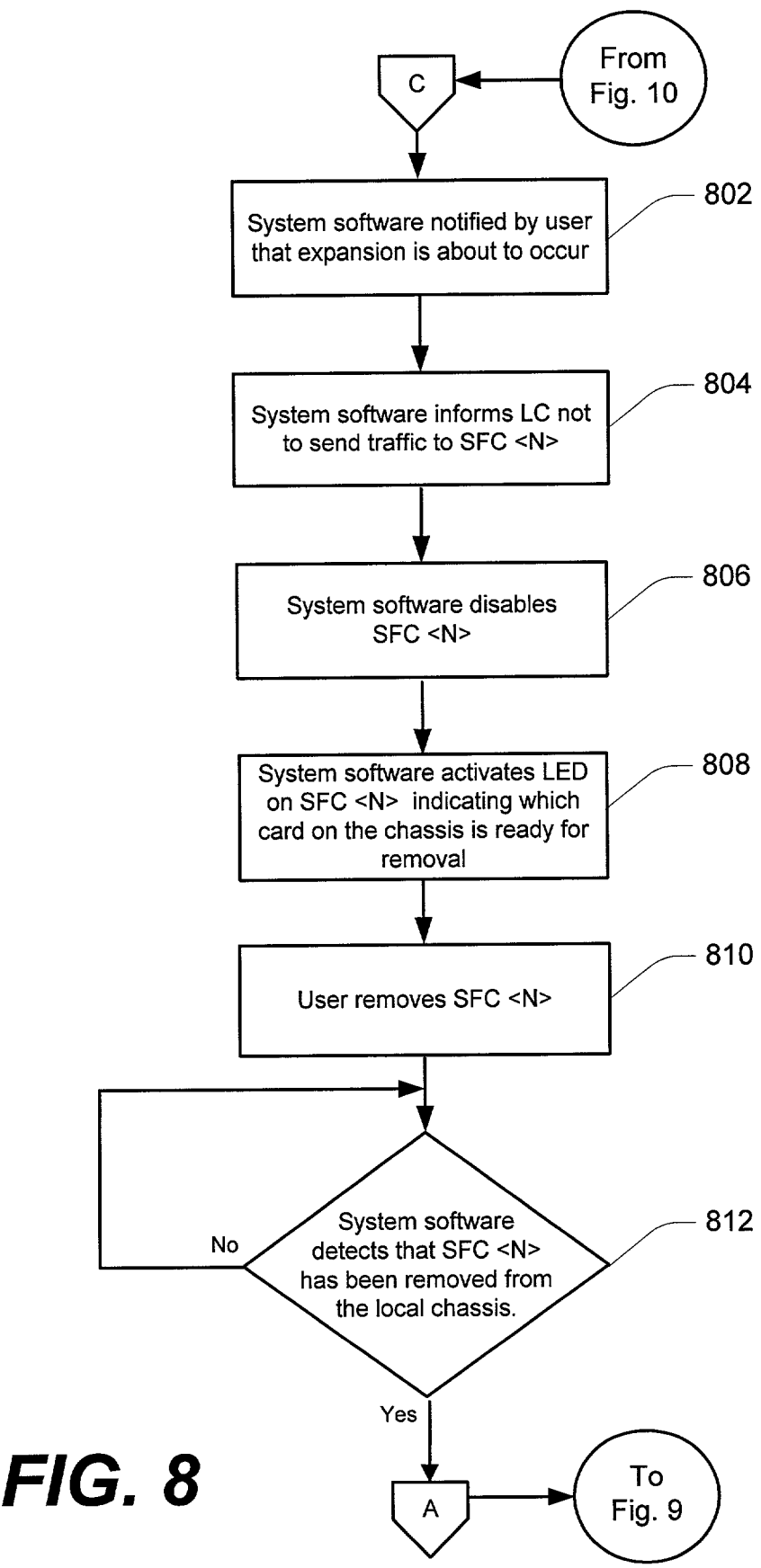
FIGS. 8-10 are flow chart diagrams of a method of maintaining or upgrading a switch fabric system according to the present invention.
Figure 9:
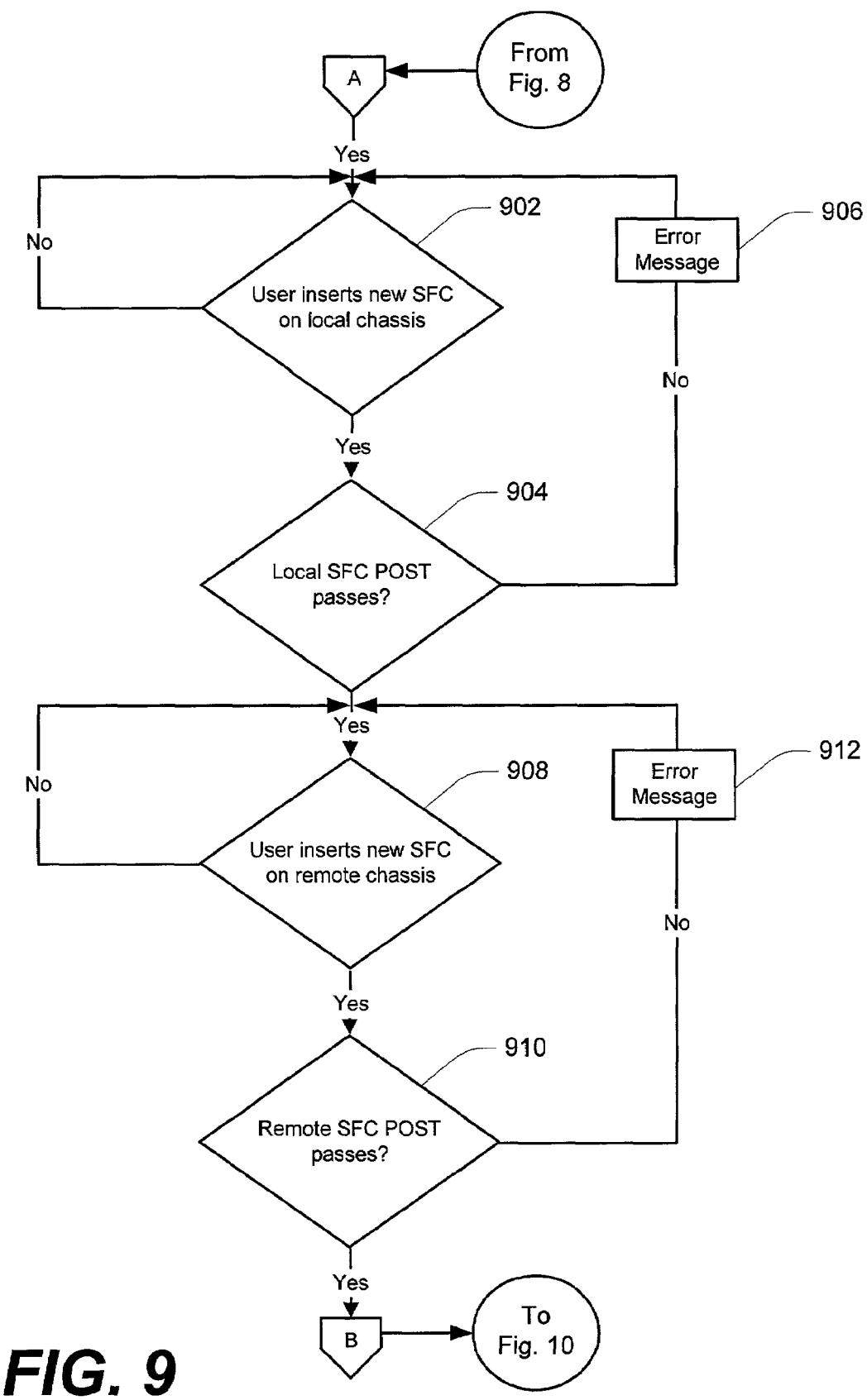
Figure 10:
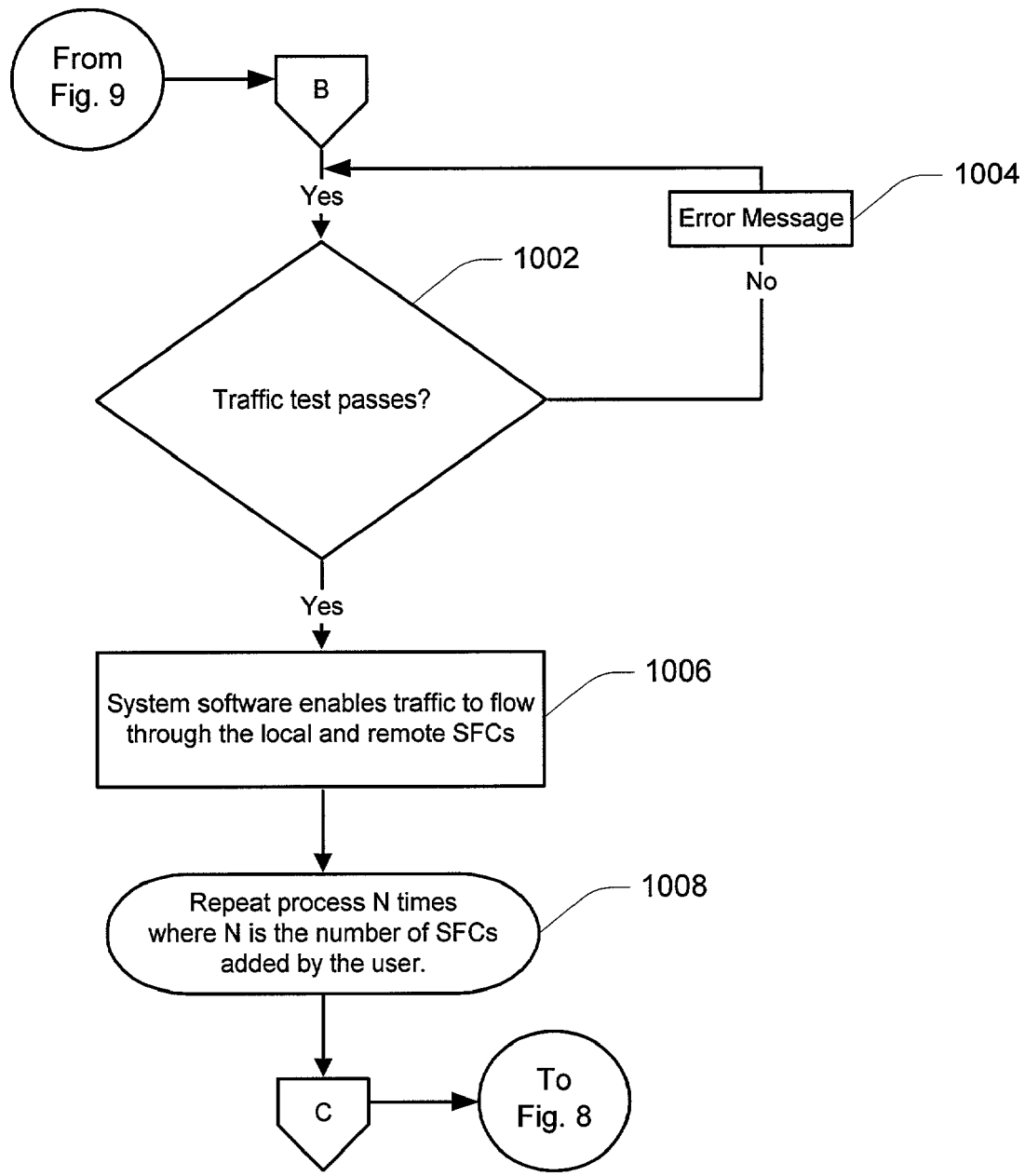

FIGS. 8-10 show flow chart diagrams of an exemplary procedure of removing, exchanging or expanding the switch fabric cards in a system according to the present invention. In step 802 the system software is notified by a user that a switch fabric card is about to be removed or added. In step 804 the system informs the respective line cards not to send any traffic to the respective slot containing the switch fabric card. Then, in step 806 the system software disable the respective switch fabric card. The system software then activates a LED on the respective switch fabric card indicating to the user which card in the chassis is ready for removal in step 808. The user then removes the respective card in step 810. In step 812, the system software waits until it detect that the switch fabric card has been actually removed. If an additional card is inserted steps 804 to 812 have no effect.

In the following step 902 shown in FIG. 9, the user inserts a new switch fabric card on the local or first chassis. If the newly inserted card operates properly step 904 is passed, otherwise an error message will be displayed in step 906. If in addition a complementary card is inserted in a remote or second chassis steps 908 and 910 will be executed. Again it will be tested whether a user has inserted a new switch fabric chassis in step 908. The procedure continues with step 910 where the card is tested. If the card fails the test an error message will be displayed in step 912.

Once all hardware has been installed, the system performs a traffic test in step 1002 shown in FIG. 10. If the whole system operates satisfactory the routine continues with step 1006, otherwise an error message will be displayed in step 1004. In step 1006, the system software enables traffic to flow through the local and remote switch fabric cards. Through step 1008, the process of adding/replacing a card can be repeated as often as necessary to update the system to its desired specification.

Figure 11:
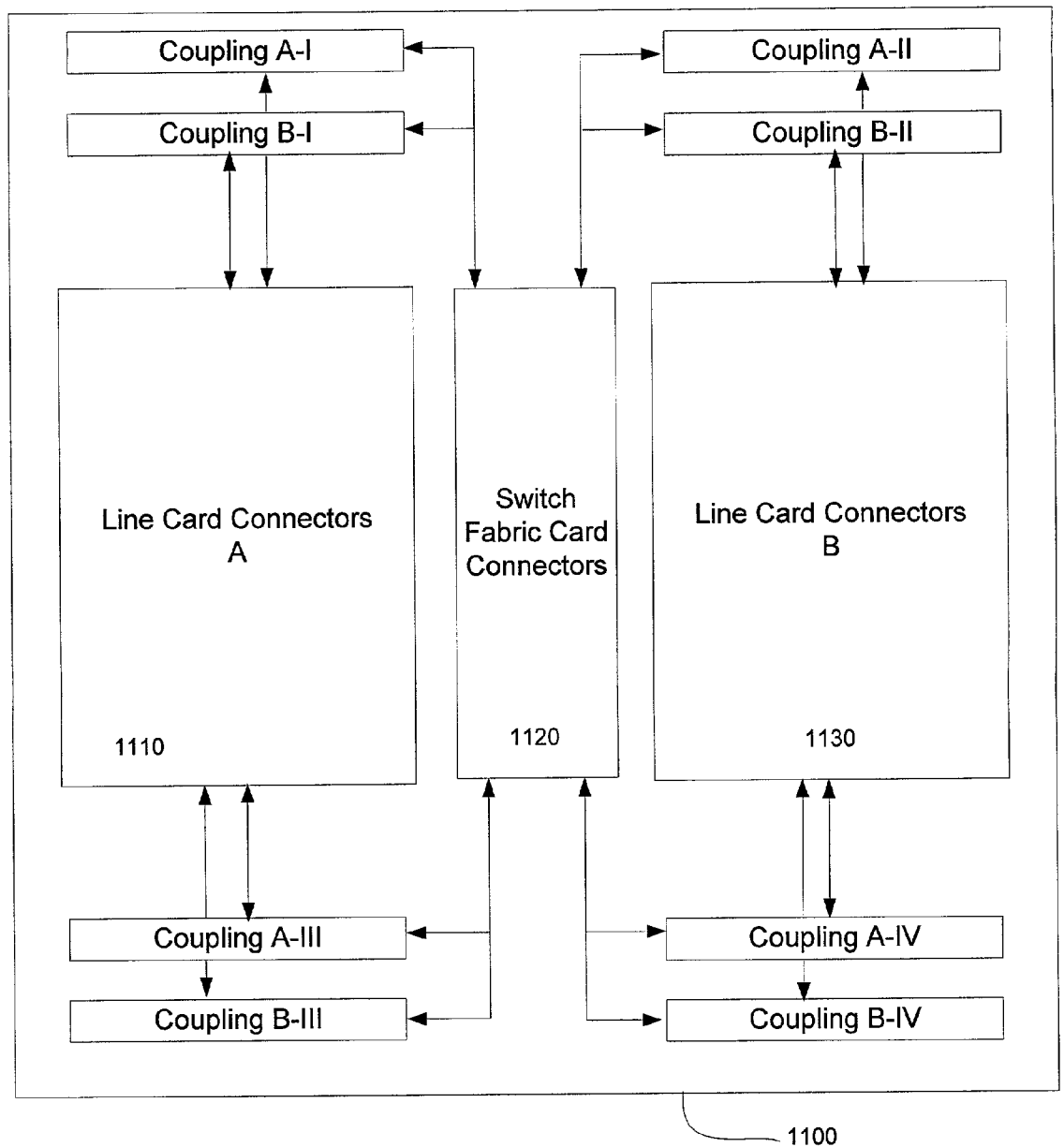
FIG. 11 shows a backplane according to another embodiment of the present invention.

FIG. 11 shows another embodiment of the present invention. This embodiment uses a single version for line cards and a single version for switch fabric cards. In addition, no coupling on the front side of the chassis is necessary which will significantly improve the handling of system and its maintenance. To this end, a specially designed back plane as shown in FIG. 11 is used. The back plane comprises in this exemplary embodiment a first line card connector field 1110 and a second line card connector field 1130 each for receiving, for example, 8 line cards. Connectors for system control cards are not shown in FIG. 1. If system control cards are used for controlling basic settings and/or re-configurations, connectors for one or more system control cards can be placed on the backplane wherever it is most suitable depending on the design of the system. Also, the backplane might have integrated system control functionality with no additional system control cards. In-between the line card connector field 1110 and 1130 there is a switch fabric card connector field 1120 for receiving, for example, three switch fabric cards. The connector fields 1110, 1120, and 1130 comprise a respective plurality of connectors suitable to couple the different cards with the back plane electrically as well as mechanically.

Such a back plane can be, for example, used in a chassis as shown in FIG. 2 to support 16 line cards and 3 switch fabric cards. The arrangement of the connectors is specifically chosen to divide the back plane into four quadrants. In this embodiment, each quadrant comprises two coupling fields A-I, B-I; A-II, B-II, A-III, B-III, and A-IV, B-IV. Each coupling field A-I, B-I; A-II, B-II, A-III, B-III, and A-IV, B-IV is coupled with the switch fabric card connectors in field 1120. Coupling A-I and B-I are additionally coupled with, for example, the connectors of line card connector field 1110, each connecting to the ¼ of the ports of the line card connector field 1110. Thus, coupling A-III couples to another ¼ of the ports and B-III to the remaining ¼ of the ports of the line card connector field 1110. Likewise the connectors of line card connector field 1130 connecting to the ports of the line cards are distributed such that ¼ of the port are coupled with each coupling field A-II, B-II, A-IV, and B-IV. The number of coupling fields depends on the system switching capabilities and the number of additional chassis as will be explained in more detail below. The placement of the coupling fields is not restricted to the four quadrants. Such an arrangement is advantageous if the actual connectors of the line card are in the middle of each card. Different designs might require a different placement of the coupling fields. There is furthermore no restriction to the number of coupling fields. The ports of each line card are distributed over the assigned coupling fields. Thus, it is advantageous to have a number of 2n coupling fields assigned to each line card, wherein n is an integer number greater or equal to 1. Thus, when one coupling field is deactivated the other coupling fields can take over the traffic handled by that coupling field.

FIG. 12A shows a particular assignment for each coupling field A-I and B-I identifying the line cards and the switch fabric cards and their respective connectors. Each connector can consist of one or two pins depending on whether unidirectional signals or bi-directional signals are transferred. Thus, each identifier in the field "LC port" and "SF port" for the line cards and the switch fabric cards represents a port. The coupling field A-I indicates on the left column the respective line card LC. "LC port" indicates which port of the line card the particular connector of the coupling field is assigned to. The "SF port" column indicates which port of the switch fabric card the particular connector of the coupling field is assigned to and the most right column indicates the number of the line card of the respective connector in the "SF port" column. Thus, coupling field A-I connects to ports 0, 4, 8, 12, 16, and 20 of each line card and to ports 0, 1, 2, 3, 4, 5, 6, 7, 32, 33, 34, 35, 36, 37, 38, and 39 of each switch fabric card. Note that the switch fabric cards each comprise 64 ports. Depending on the mode these ports can be switched independently as described above. However, in the following figures numeration will be always from 0-63 even though the ports can be assigned to independent switches. Coupling field B-I connects to ports 2, 6, 10, 14, 18, and 22 of each line card and to ports 16, 17, 18, 19, 20, 21, 22, 23, 48, 49, 50, 51, 52, 53, 54, and 55 of each switch fabric card. Coupling field A-III connects to ports 1, 5, 9, 13, 17, and 21 of each line card and to ports 8, 9, 10, 11, 12, 13, 14, 15, 40, 41, 42, 43, 44, 45, 46, and 47 of each switch fabric card. Coupling field B-III connects to ports 3, 7, 11, 15, 19, and 23 of each line card and to ports 24, 25, 26, 27, 28, 29, 30, 31, 56, 57, 58, 59, 60, 61, 62, and 63 of each switch fabric card. The above assignment can of course be chosen differently and depends on the design of the back plane, the design of the switch fabric chips and the design of the line card. When the connectors of quadrants I and III are coupled all line cards are coupled with half of all ports of all switch fabric cards. Couplings A-II, B-II and A-IV, B-IV are coupled with the line card connector field 1130 and the switch fabric card connector field 1120 in a similar way to connect the line cards with the remaining ports of the switch fabric cards. In this exemplary embodiment, the "LC port" numbers were assigned arbitrarily. The only important rule is for the "SF port". The port # of each logical switch in the "SF port" has to connect to the "LC port" on the line card #.

Figure 12B:
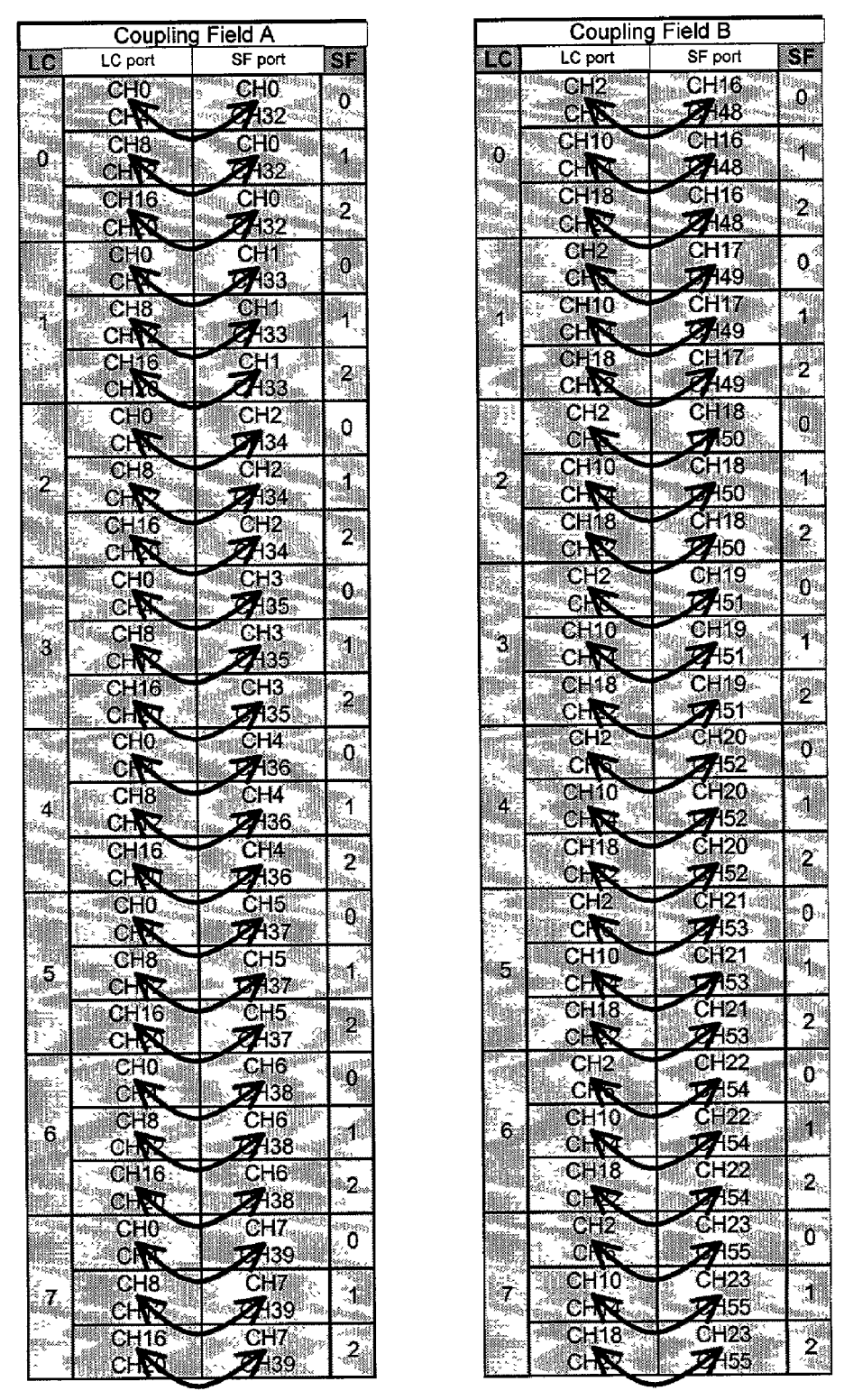

FIG. 12B shows the connection within each coupling filed A-I and B-I for the first quadrant I in a single chassis application. Each port of the "LC port" field is coupled with its neighbor port in the "SF port" field. For example, "LC port" 0 of line card 0 connects to "SF port" 0 of switch fabric card 0, "LC port" 4 of line card 0 connects to "SF port" 32 of switch fabric card 0, "LC port" 8 of line card 0 connects to "SF port" 0 of switch fabric card 1, etc. The coupling fields are accessible on the backside of the chassis. A specially adapted short cut or loop back connector, for example, a PCB board or a specially wired connector, is plugged into each coupling field, thus establishing the connection as shown in FIG. 12A. All short cut connectors can be manufactured identical because always neighboring connection pins are connected to each other in each coupling field.

Figure 13:
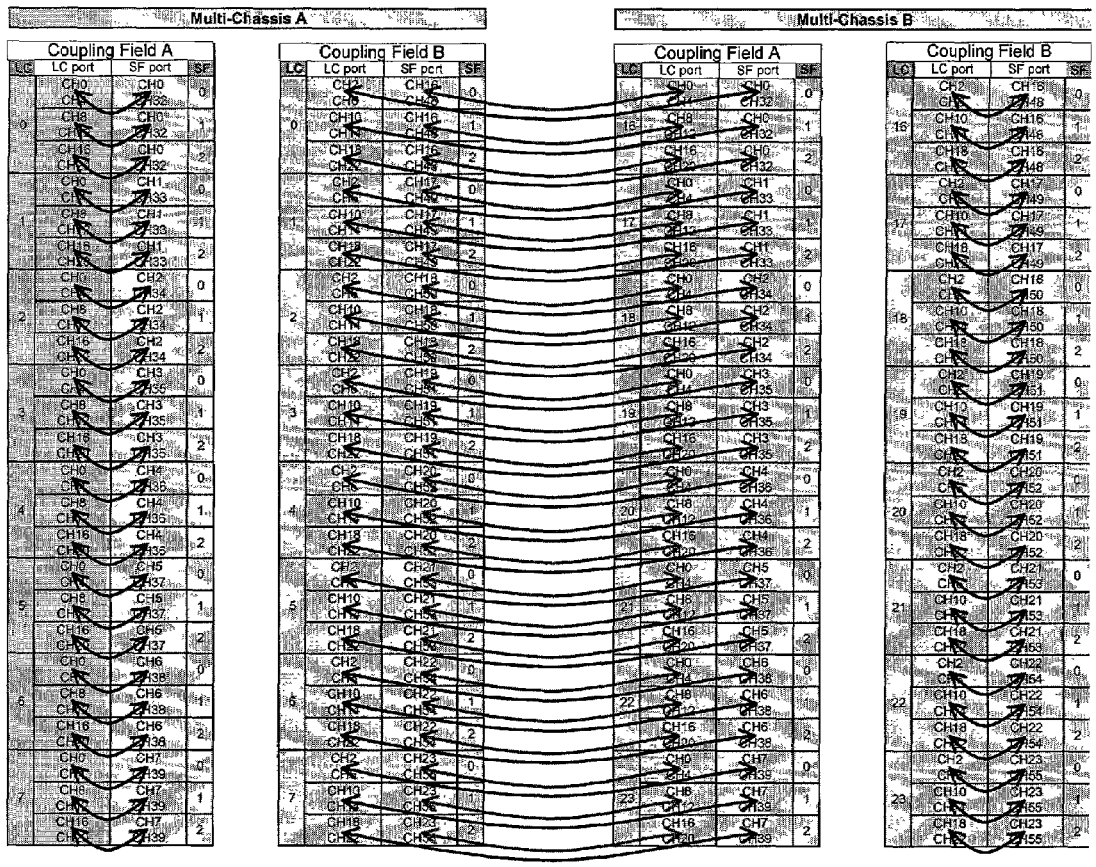
FIG. 13 shows the connections of the coupling in one quadrant according to FIG. 11 when used in a multi chassis system.

FIG. 13 shows how such a single chassis system can be easily expanded into a multi-chassis system. In each quadrant of the single chassis system one short cut connector is removed. For example, as shown in FIG. 13, the short cut connector for coupling field B-I of multi chassis A is removed. A second multi-chassis B is added. A coupling connector is then plugged into coupling field B-I of multi chassis A and coupling field A-I of multi chassis B. The removed short cut connector can now be inserted into coupling field B-I of multi chassis B. All other quadrants of the two multi chassis A and B are coupled in the same way. FIG. 13 shows only the connection of the first quadrant I. This embodiment does not require do exchange any line fabric card as can be readily seen. Through the coupling of coupling fields B of multi chassis A with the respective coupling fields A of multi chassis B.

Therefore, such a system can be expanded without entirely shutting it down. For example, the system can be equipped with sensors, in software or hardware, detecting that short cut connector for coupling field B has been removed. The system software then uses the remaining ports which are still coupled through coupling field A-I to redirect the present traffic through those remaining connections. Once all short cut connectors for all four quadrants are removed, the system can only handle half the traffic. Thus, all the connectors are never removed. If chassis A and is expanded to Chassis B, only the B-I, B-II, B-III, and B-IV short cut connectors have to be removed. All of the loop back couplings A are still there handling the traffic during the time of expansion. Therefore, it is advantageous to couple one quadrant at a time avoiding a low switching capacity during an upgrade procedure. To this end, in a first step, the second multi chassis is first fully equipped with the necessary number of additional line cards and switch fabric cards. Then, the following procedure takes place:

a) removal of the short cut connector for the first quadrant of chassis A;

b) placement of the removed short cut connector into the first quadrant of chassis B;

c) coupling of the first quadrant of chassis A and B through a link cable;

repeating of steps a)-c) for the remaining quadrants.

This procedure ensures a minimum time of low switching capacity of the system during the upgrade process. The link cable can be a copper connection or a fibre optic connection. In case of a fibre optic connection, a special adapter can be placed into the respective coupling fields. In yet another embodiment, the coupling fields can be adapted to support fibre optic connection. However, such an embodiment would increase the overall costs, as more expensive short cut or loop back connectors in fibre optic technology would be necessary.

Figure 14:
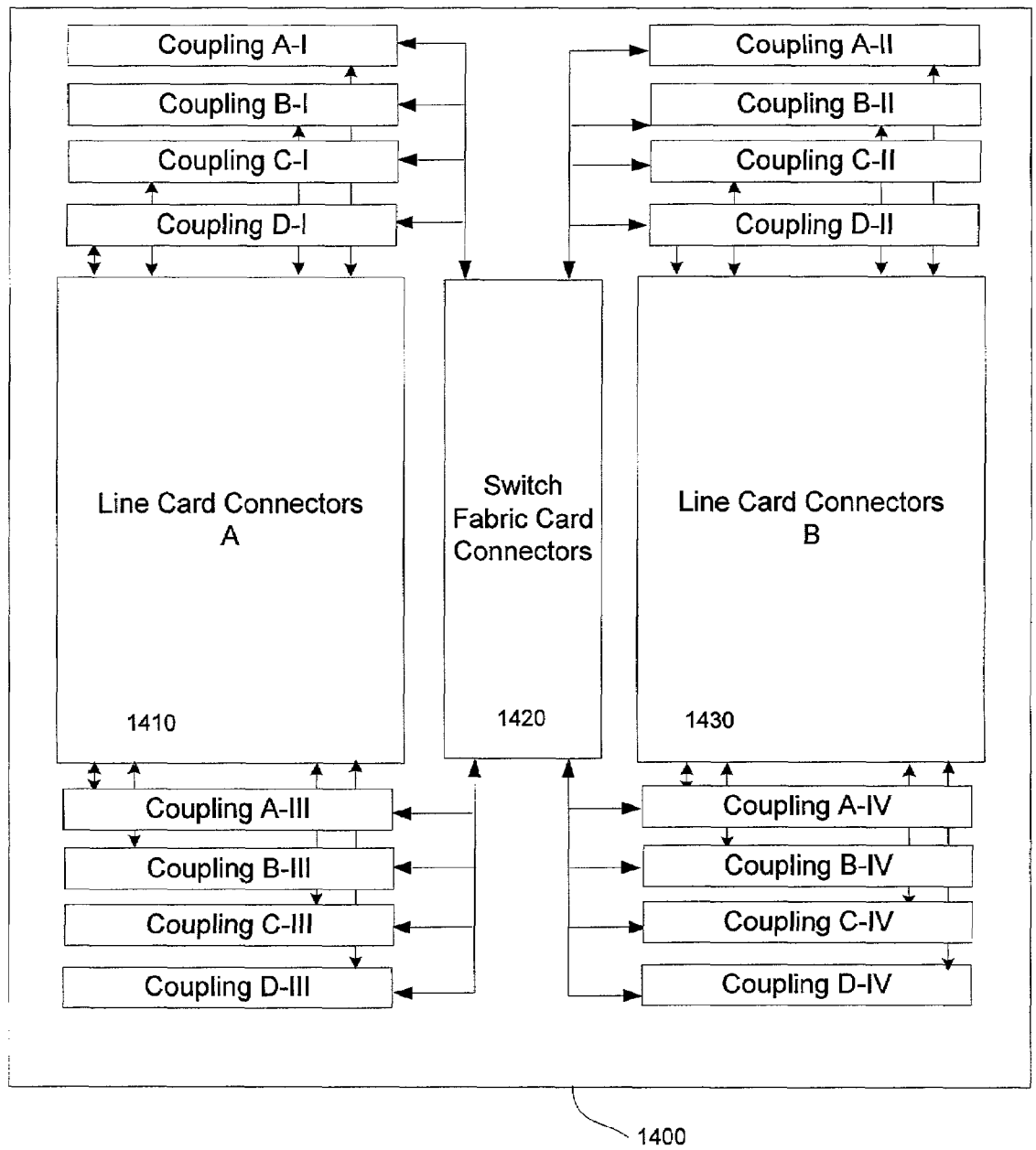
FIG. 14 shows a backplane according to yet another embodiment of the present invention.

FIG. 14 shows yet another embodiment using a similar principle as shown in FIG. 11. Instead of two coupling fields, the system uses four coupling fields per quadrant. Thus, expansion of the system is not limited to two multi-chassis but rather to four multi chassis offering even higher expansion possibilities. Instead of dividing the ports of each line card to four coupling fields the ports of each line card are distributed over eight coupling fields in a similar way as shown above. Again, the back plane 1400 comprises two line card connector fields 1410 and 1430 and one switch fabric card connector field 1420 similar as shown in FIG. 11. However, each quadrant I, II, III, and IV now comprises four coupling fields A, B, C, and D. Thus, the system can be expanded to a maximum of four multi-chassis. The number of switch fabric cards can be either higher, for example, six switch fabric cards can be installed, or the switching capacity of each card can be higher using next generation switch fabric devices.

Figure 15:
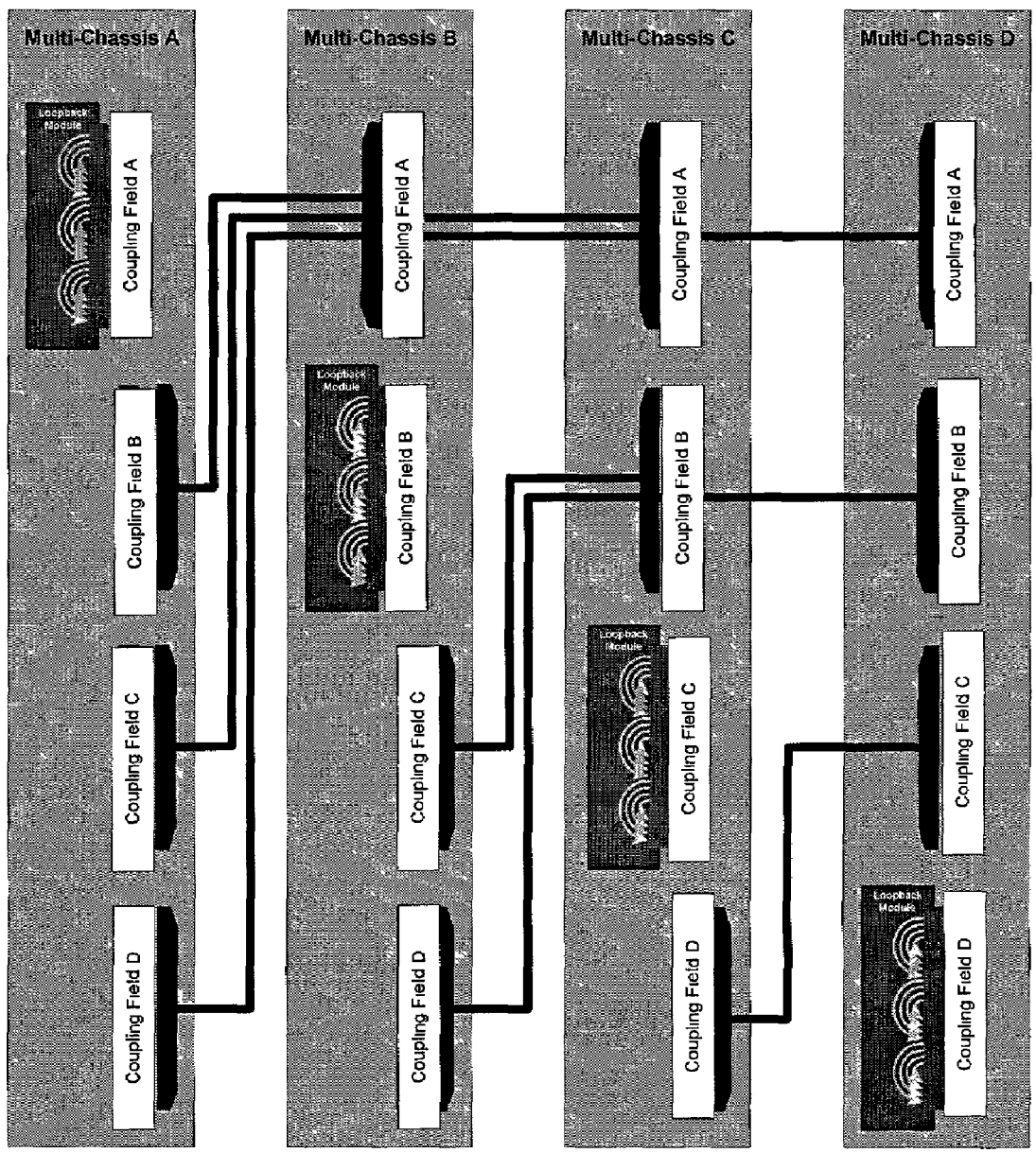
FIG. 15 shows the schematic connections of the coupling with a system according to FIG. 14 when used in a multi chassis system.

FIG. 15 shows the interconnection of a four multi-chassis A, B, C, and D for a single quadrant. All other quadrants are coupled in a similar way. The system uses one short cut or loop back connector per multi chassis. The expansion from a single chassis to a two, three, and finally four multi-chassis system will be explained as follows. In a single chassis application, all coupling fields A, B, C, and D are equipped with a short cut or loop back connector. During the first expansion, the short cut connector for coupling field B is removed and placed into coupling field B of the second multi-chassis B. Two more short cut connectors are placed into coupling fields C and D of multi chassis B. A link cable is then placed to couple coupling field B of multi chassis A with coupling field A of multi chassis B.

Adding a third and fourth chassis C requires removal of short cut connectors for coupling fields C and D of chassis A and B. Short cut connectors can be placed in coupling field C of chassis C and coupling field D of chassis D. Another link cable is used to connect coupling field C of chassis A with coupling field A of chassis C and one link cable to connect coupling field C of chassis B with coupling field B of chassis C. Finally three more link cables are placed to couple the four systems. The first link cable connects coupling field D of chassis A with coupling field A of chassis D, the second link cable couples coupling field D of chassis B with coupling field B of chassis D, and the last link cable couples coupling field D of chassis C with coupling field C of chassis D.

Even though the embodiments disclosed in the present application show chassis with 16 line cards and three switch fabric cards, the invention is not limited to these numbers. Furthermore, the invention can be adopted to expand to more than two or four chassis, for example, to four or eight chassis with a respective design of the respective switches and/or coupling fields. The s witch fabric chip switching capacity sets the limit to how many line cards can be implemented. With faster switch fabric chips more line cards can be handled. According to the principle of the present invention live expandable can be designed to handle any kind of number of line cards and thus ingress egress ports. Furthermore, to prevent a plurality of coupling fields in the embodiments shown in FIGS. 11-15, for example, only half of the coupling fields as shown in FIG. 11 have to implemented in yet another embodiment. However, in such an embodiment, two different types of back planes are necessary. The back plane of the first chassis would need only Coupling fields B-I, B-II, B-III and B-IV as coupling fields A will remain the same in a single chassis and a multi chassis system. Thus, the connections provided by coupling fields A can be permanently established on the back plane. However, if a second chassis is added as a multi-chassis, the coupling fields A are required for a link with the first chassis whereas the connections established through coupling fields B can remain. Thus, a second different back plane would be necessary which would only comprise coupling fields A. Thus, the embodiment described in this paragraph can reduce the costs for the user as the back plane needs less components and less short cut or loop back connectors. However, the embodiment previously described in connection with FIG. 11 has the advantage that only a single type of back plane has to be produced. Both type of embodiments need only one type line card, and switch fabric card as all the connections will be established through the back plane.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Switch fabric system comprising a first chassis for receiving a plurality of line cards each having a plurality of ports and at least two switch fabric cards wherein each line card comprises a plurality of link ports for linking the line card with the switch fabric card and each switch fabric card provides a switching bandwidth and wherein the system comprises a management unit for managing the traffic on the switch fabric cards wherein the management unit removes the traffic from one switch fabric card if the one switch fabric card is to be removed from the first chassis during operation while the other switch fabric card operates and transfers the traffic from the removed switch fabric card to the other switch fabric card in the first chassis and wherein:

the system further comprises a second chassis wherein the switch fabric card of the first chassis is linkable with a respective switch fabric card of the second chassis; and a switch fabric card comprises a plurality of configurable port switches, wherein in a first mode a port switch comprises m independent switches each switching n link ports and in a second mode the port switch comprises a m/2 switch switching 2n link ports, further wherein each of m and n are positive integers.

2. System according to claim 1, wherein the first chassis comprises slots for at least one switch fabric cards.

3. System according to claim 1, wherein the first chassis comprises slots for at least one line card.

4. System according to claim 1, wherein the system comprises a locking mechanism for each switch fabric card.

5. System according to claim 1, wherein the system comprises a locking mechanism for each line card.

6. System according to claim 1, wherein each switch fabric card comprises an indicator for indicating that the switch fabric card is ready for removal.

7. System according to claim 1, wherein the system comprises a controller coupled with a input request unit for controlling the configuration of each switch fabric card.

8. System according to claim 7, wherein the system comprises a locking mechanism for each switch fabric card coupled with the controller.

9. Switch fabric system comprising a first chassis for receiving a plurality of line cards each having a plurality of ports and at least two switch fabric cards wherein each line card comprises a plurality of link ports for linking the line card with the switch fabric card and each switch fabric card provides a switching bandwidth and wherein the system comprises a management unit for managing the traffic on the switch fabric cards wherein the management unit removes the traffic from one switch fabric card if the one switch fabric card is to be removed from the first chassis during operation while the other switch fabric card operates and transfers the traffic from the removed switch fabric card to the other switch fabric card in the first chassis and wherein:

the system further comprises a second chassis wherein the switch fabric card of the first chassis is linkable with a respective switch fabric card of the second chassis; and the first chassis comprises a switch fabric card for switching at least one set of m link ports and receives at least one set of m/2 link ports from the associated switch fabric card of the second chassis and wherein m/2 link ports of the m link ports are fed through to the associated switch fabric card of the second chassis and the switch fabric card switches at least one set of m/2 link ports of the first chassis combined with at least one set of m/2 link ports of the second chassis, further wherein each of m and n are positive integers.

10. System according to claim 1, wherein the associated switch fabric cards are linked by optical link coupling.

11. System according to claim 9, wherein the first chassis comprises configurable switch fabric cards operating in a first mode in which each switch switches m/2 link ports from the first chassis and in a second mode each switch switches m link ports from the first and second chassis.

12. Switch fabric card for a switch fabric system having at least a first and a second chassis for receiving a plurality of line cards each having a plurality of ports and a plurality of switch fabric cards wherein each line card comprises a plurality of link ports for linking the line card with the switch fabric card comprising:
at least one switch for switching a plurality of link ports receiving a first set of link ports from the first chassis and a second set of link ports from a first interface;
a second switch for switching a plurality of link ports receiving a third set of link ports from the first chassis and a fourth set of link ports from the first interface; and
a feed through coupling for coupling at least a second set of link ports to a second interface, wherein:
the first and the second interface couples with a second switch fabric card in the second chassis; and
the feed through coupling comprises a fifth and a sixth set of link ports to the second interface.

13. Switch fabric card according to claim 12, wherein the first and the second interface is a fibre optic interface.

14. Switch fabric card according to claim 12, wherein each link port comprises a transmit line and a receive line.

15. Switch fabric card according to claim 12, further comprising a first multiplexer for coupling the second set of link ports with the second interface or a second multiplexer for coupling the switch with the first interface or the first multiplexer.

16. Switch fabric card according to claim 12, wherein the layout of a switch fabric card for the first chassis is complementary to a layout for a switch fabric card for the second chassis.

17. Switch fabric system comprising a first chassis for receiving a plurality of line cards each having a plurality of ports and at least one switch fabric card wherein each line card comprises a plurality of link ports and a back plane for linking the line cards with the switch fabric card and each switch fabric card provides a switching bandwidth and wherein the system comprises a management unit for managing the traffic on the switch fabric cards wherein the back plane comprises at least one coupling field which can couple the link ports of the line card with the switch fabric cards, the management unit redirects the traffic through existing port couplings if the traffic through the coupling of at least one coupling field is interrupted and wherein the system comprises a second chassis wherein the switch fabric card of the first chassis is linkable with a respective switch fabric card of the second chassis;
wherein the ports of each line card are distributed to a plurality of coupling fields and each coupling field is coupled with all switch fabric cards;
wherein the back plane comprises a line card connector field and a switch fabric card connector field;
wherein at least 2n coupling fields are associated to each line card connector field, n being an integer number greater or equal to one; and
wherein the a first line card connector field and a second line card connector field are placed to the left and right side of the switch fabric card connector field in the center of the back plane thus creating four quadrants, each quadrant comprising the 2n coupling fields.

18. Back plane for a first switch fabric system comprising a first chassis, for receiving a plurality of line cards each having a plurality of ports and at least one switch fabric card wherein each line card comprises a plurality of link ports, wherein the back plane comprises at least one coupling field for receiving a loop back connector or a link connector for coupling the link ports of the line card with the switch fabric cards or for coupling with another back plane of a second switch fabric system comprising a second chassis through the link connector;
wherein the ports of each line card are distributed to a plurality of coupling fields and each coupling field is coupled with all switch fabric cards;
wherein the back plane comprises a line card connector field and a switch fabric card connector field;
wherein at least 2n coupling fields are associated to each line card connector field, n being an integer number greater or equal to one, wherein the a first line card connector field and a second line card connector field are placed to the left and right side of the switch fabric card connector field in the center of the back plane thus creating four quadrants, each quadrant comprising the 2n coupling fields.

19. System according to claim 9, wherein the first chassis comprises slots for at least one switch fabric cards.

20. System according to claim 9, wherein the first chassis comprises slots for at least one line card.

21. System according to claim 9, wherein the system comprises a locking mechanism for each switch fabric card.

22. System according to claim 9, wherein the system comprises a locking mechanism for each line card.

23. System according to claim 9, wherein each switch fabric card comprises an indicator for indicating that the switch fabric card is ready for removal.

24. System according to claim 9, wherein the system comprises a controller coupled with a input request unit for controlling the configuration of each switch fabric card.

25. System according to claim 24, wherein the system comprises a locking mechanism for each switch fabric card coupled with the controller.

26. System according to claim 9, wherein the associated switch fabric cards are linked by optical link coupling.

* * * * *